United States Patent
Suto et al.

(10) Patent No.: US 12,129,379 B2
(45) Date of Patent: *Oct. 29, 2024

(54) CURABLE SILICONE COMPOSITION, RELEASE COATING AGENT COMPRISING SAID COMPOSITION, RELEASE FILM OBTAINED USING SAID RELEASE COATING AGENT, AND LAYERED PRODUCT INCLUDING SAID RELEASE FILM

(71) Applicant: Dow Toray Co., Ltd., Tokyo (JP)

(72) Inventors: Michitaka Suto, Chiba (JP); Tadashi Okawa, Chiba (JP); Satoshi Onodera, Chiba (JP); Hidefumi Tanaka, Chiba (JP); Haruhiko Furukawa, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 779 days.

This patent is subject to a terminal disclaimer.

(21) Appl. No.: 17/418,394

(22) PCT Filed: Dec. 27, 2019

(86) PCT No.: PCT/JP2019/051372
§ 371 (c)(1),
(2) Date: Oct. 1, 2021

(87) PCT Pub. No.: WO2020/138399
PCT Pub. Date: Jul. 2, 2020

(65) Prior Publication Data
US 2022/0073749 A1 Mar. 10, 2022

(30) Foreign Application Priority Data

Dec. 27, 2018 (JP) .................. 2018-245683

(51) Int. Cl.
| | |
|---|---|
| *C08L 83/08* | (2006.01) |
| *C08G 77/08* | (2006.01) |
| *C08G 77/12* | (2006.01) |
| *C08G 77/20* | (2006.01) |
| *C08G 77/24* | (2006.01) |
| *C08G 77/46* | (2006.01) |
| *C09J 7/40* | (2018.01) |

(52) U.S. Cl.
CPC ............. *C08L 83/08* (2013.01); *C08G 77/08* (2013.01); *C08G 77/12* (2013.01); *C08G 77/20* (2013.01); *C08G 77/24* (2013.01); *C08G 77/46* (2013.01); *C09J 7/401* (2018.01); *C08L 2201/10* (2013.01); *C08L 2203/16* (2013.01); *C08L 2205/025* (2013.01); *C08L 2205/03* (2013.01); *C09J 2301/162* (2020.08); *C09J 2483/005* (2013.01)

(58) Field of Classification Search
CPC .................. C08G 77/24; C08G 77/46
See application file for complete search history.

(56) References Cited

U.S. PATENT DOCUMENTS

| 4,529,752 A | 7/1985 | Bluestein |
|---|---|---|
| 4,968,766 A | 11/1990 | Kendziorski |
| 4,985,526 A | 1/1991 | Kishita et al. |
| 5,073,422 A * | 12/1991 | Konno ............. C08G 77/24 |
| | | 528/42 |
| 5,082,706 A | 1/1992 | Tangney |
| 5,097,054 A | 3/1992 | Yamamoto et al. |
| 5,166,294 A | 11/1992 | Kishita et al. |
| 5,578,381 A | 11/1996 | Hamada et al. |
| 2004/0186225 A1 | 9/2004 | Yamaguchi |
| 2012/0219794 A1 | 8/2012 | Seth et al. |
| 2016/0297999 A1 | 10/2016 | Carvajal et al. |
| 2016/0329562 A1 | 11/2016 | Akira et al. |

(Continued)

FOREIGN PATENT DOCUMENTS

| JP | 5980464 A | 5/1984 |
|---|---|---|
| JP | S63255288 A | 10/1988 |

(Continued)

OTHER PUBLICATIONS

Machine assisted English translation of JP2007326312 obtained from https://patents.google.com/patent on Feb. 17, 2023, 22 pages.
International Search Report for PCT/JP2019/051372 dated Feb. 18, 2020, 3 pages.
Machine assisted English translation of JP2017165893A obtained from https://patents.google.com/patent on Oct. 5, 2021, 9 pages.
Machine assisted English translation of JP2016182772A obtained from https://patents.google.com/patent on Oct. 5, 2021, 16 pages.
Machine assisted English translation of JP2004300414A obtained from https://patents.google.com/patent on Oct. 5, 2021, 8 pages.
Machine assisted English translation of JP2010135617A obtained from https://patents.google.com/patent on Oct. 5, 2021, 10 pages.
Machine assisted English translation of JPH08325995A obtained from https://patents.google.com/patent on Oct. 5, 2021, 8 pages.

(Continued)

*Primary Examiner* — Marc S Zimmer
(74) *Attorney, Agent, or Firm* — Warner Norcross + Judd LLP

(57) ABSTRACT

Provided is a curable silicone composition for a release agent which can form a release film having a silicone adhesive with a low release force even when thin and which does not reduce the adhesive strength of the silicone adhesive to other substrates upon releasing the release film. A release film and laminate are also provided. The curable silicone composition comprises: (A) a fluorine-containing organopolysiloxane mixture obtained by mixing the following components (A1) and (A2) at a mass ratio of 1/99 to 45/55: (A1) a fluoro(poly)ether modified organopolysiloxane having at least two alkenyl groups per molecule along with a fluoro(poly)ether-containing organic group; (A2) a fluoroalkyl group-containing organopolysiloxane having at least two alkenyl groups per molecule along with a fluoroalkyl group having 1 to 12 carbon atoms; (B) an organopolysiloxane having at least three silicon atom-bonded hydrogen atoms per molecule; (C) a hydrosilylation reaction catalyst; and (D) an organic solvent.

19 Claims, 4 Drawing Sheets

(56) References Cited

U.S. PATENT DOCUMENTS

| | | |
|---|---|---|
| 2018/0086915 A1 | 3/2018 | Tsuchida |
| 2020/0071527 A1 | 3/2020 | Fukui et al. |
| 2022/0064497 A1* | 3/2022 | Suto ..................... B32B 23/042 |

FOREIGN PATENT DOCUMENTS

| | | |
|---|---|---|
| JP | S6474268 A | 3/1989 |
| JP | H02189383 A | 7/1990 |
| JP | H02245031 A | 9/1990 |
| JP | H03197484 A | 1/1994 |
| JP | H06145527 A | 5/1994 |
| JP | H06321968 A | 11/1994 |
| JP | H0873809 A | 3/1996 |
| JP | H08325995 A | 12/1996 |
| JP | H08325998 A | 12/1996 |
| JP | H11246772 A | 9/1999 |
| JP | 2004300414 A | 10/2004 |
| JP | 2005060554 A | 3/2005 |
| JP | 2007211186 A | 8/2007 |
| JP | 2007326312 A | 12/2007 |
| JP | 2010135617 A | 6/2010 |
| JP | 2013510921 A | 3/2013 |
| JP | 2016182772 A | 10/2016 |
| JP | 2016183291 A | 10/2016 |
| JP | 2017505361 A | 2/2017 |
| JP | 2017165893 A | 9/2017 |
| WO | 2016098334 A1 | 6/2016 |
| WO | 2016152992 A1 | 9/2016 |
| WO | 2018211981 A | 11/2018 |

OTHER PUBLICATIONS

Machine assisted English translation of JP2007211186A obtained from https://patents.google.com/patent on Oct. 5, 2021, 10 pages.
Machine assisted English translation of JPH06145527A obtained from https://patents.google.com/patent on Oct. 5, 2021, 8 pages.
Machine assisted English translation of JP2005060554A obtained from https://patents.google.com/patent on Oct. 5, 2021, 9 pages.
Machine assisted English translation of JP2016183291A obtained from https://patents.google.com/patent on Oct. 5, 2021, 14 pages.
Machine assisted English translation of JPH08325998A obtained from https://patents.google.com/patent on Oct. 6, 2021, 10 pages.
Machine assisted English translation of JPS63255288A obtained from https://worldwide.espacenet.com on Oct. 6, 2021, 4 pages.
Machine assisted English translation of JPH06321968A obtained from https://patents.google.com/patent on Oct. 6, 2021, 6 pages.
Machine assisted English translation of JPH11246772A obtained from https://patents.google.com/patent on Oct. 6, 2021, 8 pages.

* cited by examiner

CURABLE SILICONE COMPOSITION, RELEASE COATING AGENT COMPRISING SAID COMPOSITION, RELEASE FILM OBTAINED USING SAID RELEASE COATING AGENT, AND LAYERED PRODUCT INCLUDING SAID RELEASE FILM

CROSS-REFERENCE TO RELATED APPLICATIONS

This application is the U.S. National Stage of International Application No. PCT/JP2019/051372 filed on 27 Dec. 2019, which claims priority to and all advantages of Japanese Application No. 2018-245683 filed on 27 Dec. 2018, the content of which is incorporated herein by reference.

TECHNICAL FIELD

The present invention relates to a curable silicone composition, a release coating agent consisting of the composition, specifically, a release coating agent for a silicone adhesive (pressure sensitive adhesive), a release film using the release coating agent, specifically, a release film for a silicone adhesive, and a laminate including the release film, specifically, a laminate including the release film and the silicone adhesive.

BACKGROUND ART

Silicone adhesives (pressure-sensitive adhesives) have been widely used as adhesives for industrial protective tapes, masking tapes, etc. or various medical functional tapes due to the excellent heat resistance, cold resistance, weather resistance, chemical resistance, and electrical insulation thereof, etc. Moreover, in recent years, silicone adhesives have been used for so-called assembly applications represented by optical components for liquid crystal displays (display devices, functional films, lenses, etc.). Since silicone adhesives strongly adhere to surfaces coated with silicone rubber or silicone-based materials, normal silicone based release agents used in acrylic and organic rubber based adhesives cannot be used, with various curable silicone release agent compositions having been proposed to form a release film enabling the easy release of the silicone adhesive. The composition is coated on a flexible substrate such as a plastic film as a release coating agent to form a release film, which is used as a laminate of a sheet or rolled tape adhered together with a silicone adhesive.

When the release film is released from such a laminate and used, a lower stable release force is required in order to increase the working efficiency and prevent surface roughness of the silicone adhesive upon release.

In contrast, the adhesive force of the silicone adhesive released from the release film preferably has low adverse effects such as a reduction in the adhesive force caused by long-term adhesion with the release film.

For example, as a release agent composition for a silicone adhesive, Patent Document 1 proposes a curable coating composition including: an organopolysiloxane having at least 300 silicon atoms, from 0.5 to 2 mole % of a vinyl group-containing siloxane unit, and 30 mole % of a fluoroalkyl group-containing siloxane unit; an organohydrogenpolysiloxane having an average of at least two silicon atom-bonded hydrogen atoms in each molecule in addition to being compatible with the organopolysiloxane; a hydrosilylation reaction catalyst; and a hydrosilylation reaction inhibitor.

Moreover, Patent Document 2 discloses a release agent composition for a silicone adhesive which includes: an organopolysiloxane having at least two alkenyl group-containing organic groups bonded to silicon per molecule and containing at least one fluorine-containing substituent (selected from the group consisting of multiple fluoro(poly) ether groups) bonded to silicon atoms per molecule; an organohydrogenpolysiloxane having at least three silicon atom-bonded hydrogen atoms per molecule; and a hydrosilylation reaction catalyst.

Further, Patent Document 3 proposes a release agent composition for a silicone adhesive including two fluoroalkyl-modified polydimethylsiloxanes having different amounts of alkenyl groups for the purpose of light release, as well as a release sheet formed by applying the release agent composition to a substrate.

Furthermore, Patent Document 4 proposes a silicone composition for forming a different release agent for a silicone adhesive containing: an organohydrogenpolysiloxane which, per molecule, contains at least two alkenyl groups bonded to silicon atoms, and at least one fluoroalkyl group and fluoropolyether group as two fluorine-containing substituents bonded to silicon atoms (wherein, the content of fluoropolyether groups relative to the total of fluoroalkyl groups and fluoropolyether groups is 1 to 99 mole %); an organohydrogenpolysiloxane having at least three hydrogen atoms bonded to silicon atoms per molecule; and a platinum-group metal-based catalyst. Moreover, in this example, the composition includes an organopolysiloxane having at least one fluoroalkyl group and fluoropolyether group as two fluorine-containing substituents bonded to silicon atoms, wherein a composition which includes an organopolysiloxane having only a 3,3,4,4,5,5,6,6,7,7,8,8,8-tridecafluorooctyl group as a fluorine-containing substituent along with an organopolysiloxane having only a fluoropolyether group as a fluorine-containing substituent is prepared to compare the release performance.

PRIOR ART DOCUMENTS

Patent Documents

Patent Document 1: Japanese Unexamined Patent Application Publication No. H2-245031
Patent Document 2: Japanese Unexamined Patent Application Publication No. H1-74268
Patent Document 3: Japanese Unexamined Patent Application Publication No. 2005-60554
Patent Document 4: Japanese Unexamined Patent Application Publication No. 2017-165893

SUMMARY OF THE INVENTION

Problems to be Solved by the Invention

However, there is a demand for further improvement in order to solve the problem in which even when a release film, as well as a laminate, is formed using a conventionally known composition as a release coating, the release film can be released from the silicone adhesive with a lower release force, and further, the adhesive force of the silicone adhesive to other substrates upon releasing the release film is not reduced as much as possible.

Moreover, when a composition including an organopolysiloxane having only a fluoroalkyl group and an organopolysiloxane having only a fluoropolyether group, at a mass ratio of 1:1, is used, as described in Patent Document 4 as a comparative example, it is problematic in that the release force value when releasing the release film from the silicone adhesive is not stable and the surface of the silicone adhesive after release is roughened.

An object of the present invention is to provide: a release film which can be released from a silicone adhesive (also referred to as a silicone pressure sensitive adhesive) (which is adhered to a thin layer even when the release layer is a thin layer) with a low release force, has a stable release force with respect to the silicone adhesive, and does not significantly reduce the adhesive force of the silicone adhesive upon releasing the release film after adhering together the release film, compared with the case in which the release film has not been adhered together; a release agent for such a release film; a curable silicone composition which can be used as a release agent; and a laminate which includes a substrate, a silicone adhesive layer, and a release agent layer. Note that the release film generally includes a release layer formed by coating a release agent on a flexible substrate such as a plastic film.

Means for Solving the Problems

The present inventors found that the abovementioned problems can be solved by using a release agent which is obtained by combining: a fluoro(poly)ether-modified organopolysiloxane as a fluorine-containing organopolysiloxane having at least two alkenyl groups per molecule along with a fluoro(poly)ether-containing organic group; and a fluoroalkyl group-containing organopolysiloxane having at least two alkenyl groups per molecule along with a fluoroalkyl group having 1 to 12 carbon atoms, at a mass ratio of 1/99 to 45/55, thereby completing the present invention.

The curable silicone composition of the present invention contains:
(A) a fluorine-containing organopolysiloxane mixture obtained by mixing the following components (A1) and (A2) at a mass ratio (components (A1)/(A2)) of 1/99 to 45/55:
(A1) a fluoro(poly)ether modified organopolysiloxane having at least two alkenyl groups per molecule along with a fluoro(poly)ether-containing organic group;
(A2) a fluoroalkyl group-containing organopolysiloxane having at least two alkenyl groups per molecule along with a fluoroalkyl group having 1 to 12 carbon atoms;
(B) an organopolysiloxane having at least three silicon atom-bonded hydrogen atoms per molecule;
(C) a hydrosilylation reaction catalyst; and
(D) an organic solvent.

Component (A) preferably includes components (A1) and (A2) at a mass ratio of 2/98 to 40/60.

Component (B) is preferably an organopolysiloxane having a fluoroalkyl group with 1 to 12 carbon atoms or a fluoro(poly)ether-containing organic group.

Component (D) is preferably a solvent mixture consisting of one solvent or two or more solvents selected from the group consisting of diethyl ether, dipropyl ether, diisopropyl ether, dibutyl ether, diisobutyl ether, di-sec-butyl ether, di-tert-butyl ether, methyl-tert-butyl ether, ethyl-tert-butyl ether, pentane, m-xylene hexafluoride, methylheptafluoropropyl ether, methylnonafluorobutyl ether, ethylnonafluorobutyl ether, and 3-methoxy-1,1,1,2,2,3,4,4,5,5,6,6,6-tridecafluoro hexane.

The curable silicone composition according to the present invention preferably further includes (E) a hydrosilylation reaction control agent.

The present invention further provides a release coating agent, wherein the release coating agent according to the present invention consists of the abovementioned curable silicone composition. The release coating agent according to the present invention can further include an additive.

In one aspect of the present invention, the release coating agent is a release coating agent for a silicone adhesive.

The present invention relates to a release film including: a film-like substrate; and a release layer consisting of a cured product obtained by curing the release coating agent.

The substrate is preferably a plastic film and is also preferably light transmissive.

The release layer preferably has a thickness of 0.5 μm or less.

In one aspect of the present invention, the release film is a release film for silicone adhesives.

The present invention further provides a laminate using the abovementioned release coating agent. In one aspect of the present invention, the laminate is a laminate including a structure in which a silicone adhesive layer is disposed so as to face at least one release layer, wherein the release layer is a release layer consisting of a cured product formed by curing the release coating agent. Moreover, the release film according to the present invention includes a film-like substrate and a release layer. Moreover, the laminate includes a laminate structure configured to include a silicone adhesive disposed on the release layer, in addition to including: a laminate which includes an adhesive formed by a curing reaction on the release layer; and a laminate formed by adhering together a release layer to a previously formed adhesive.

Effects of the Invention

Upon using the curable silicone composition according to the present invention as a release coating agent, even if the thickness of the release layer is thin, a release film can be formed in which the silicone adhesive adhered on the release layer can be released from the release layer with a low release force. Moreover, the release film and laminate according to the present invention can stably release a silicone adhesive disposed on the release layer (including an adhesive formed by a curing reaction on the release layer; and a laminate formed by adhering together a release layer to a previously formed adhesive) from the release layer with a low release force, such that the silicone adhesive after release can have a uniform surface. Further, the adhesive force of the silicone adhesive can be maintained at a high proportion even after the release layer is adhered and then released compared to prior to adhering the release layer according to the present invention.

MODE FOR CARRYING OUT THE INVENTION

Figure 1:
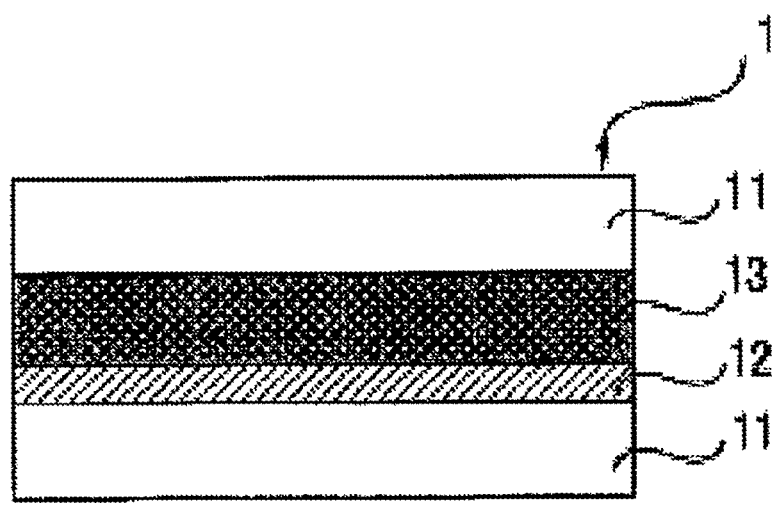
FIG. 1 is a cross sectional view illustrating one embodiment of a laminate according to the present invention.

The curable silicone composition of the present invention is described below in detail.

[Curable Silicone Composition]

The curable silicone composition of the present invention contains:
- (A) a fluorine-containing organopolysiloxane mixture obtained by mixing the following components (A1) and (A2) at a mass ratio of 1/99 to 45/55:
- (A1) a fluoro(poly)ether modified organopolysiloxane having at least two alkenyl groups per molecule along with a fluoro(poly)ether-containing organic group;
- (A2) a fluoroalkyl group-containing organopolysiloxane having at least two alkenyl groups per molecule along with a fluoroalkyl group having 1 to 12 carbon atoms;
- (B) an organopolysiloxane having at least three silicon atom-bonded hydrogen atoms per molecule;
- (C) a hydrosilylation reaction catalyst; and
- (D) an organic solvent.

Optional components which may be further added to these essential components (A), (B), (C), and (D) will be described along with the curable silicone composition.

[Component (A)]

Component (A) is a fluorine-containing organopolysiloxane mixture obtained by mixing, at a mass ratio of 1/99 to 45/55: (A1) a fluoro(poly)ether modified organopolysiloxane having at least two alkenyl groups per molecule along with a fluoro(poly)ether-containing organic group; and (A2) a fluoroalkyl group-containing organopolysiloxane having at least two alkenyl groups per molecule along with a fluoroalkyl group having 1 to 12 carbon atoms. Component (A) includes components (A1) and (A2) at a mass ratio of 1/99 to 45/55, but preferably includes components (A1) and (A2) at a mass ratio of 1.5/98.5 to 40/60, more preferably at a mass ratio of 2/98 to 40/60, and particularly preferably at a mass ratio of 2/98 to 35/65. When components (A1) and (A2) are used in combination, a release force is obtained that is lower than the release force for the silicone adhesive, which is estimated by arithmetic means, based on the results of independently using component (A1) or (A2) instead of component (A).

The molecular structure of components (A1) and (A2) is not limited. Examples thereof include a straight-chain structure, a branched-chain structure, a partially branched straight-chain structure, a resinous structure, and a cyclic structure, with a straight-chain structure or a partially branched straight-chain structure being preferable.

An example of such component (A1) is an organopolysiloxane represented by the following average unit formula (I):

$$(R^1_3SiO_{1/2})_a(R^1_2SiO_{2/2})_b(R^1SiO_{3/2})_c(SiO_{4/2})_d \quad (I)$$

(wherein, the $R^1$ moieties are the same or different and are each independently alkyl groups having from 1 to 12 carbon atoms, alkenyl groups having from 2 to 12 carbon atoms, aryl groups having from 6 to 12 carbon atoms, aralkyl groups having from 7 to 12 carbon atoms, or fluoro(poly)ether-containing organic groups having from 2 to 30 carbon atoms, provided that per molecule, at least two $R^1$ moieties are alkenyl groups and at least one $R^1$ moiety is a fluoro(poly)ether-containing organic group; a is a positive number; b is a positive number; c is 0 or a positive number; and d is 0 or a positive number.) Moreover, for a to d in the abovementioned formula (I), a is an integer of 2 or more, preferably an integer of 2 to 6, b is an integer of 1 or more, preferably an integer of 1 to 5,000, more preferably an integer of 30 to 3,000, c is 0 or a positive number, and d is 0 or a positive number. When the degree of siloxane polymerization is less than the lower limit of the range described above, when the curable silicone composition obtained using this component is used as a release coating agent, formation of the release layer may be difficult, while when the degree of siloxane polymerization exceeds the upper limit of the range described above, the coating properties (particularly thin film applicability) of the obtained curable silicone composition may decrease. Note that in formula (I), $R^1$ may be a small amount of hydroxyl groups or alkoxy groups as long as it does not impair the object of the present invention.

Exemplary alkyl groups which may be represented by $R^1$ in formula (I) having 1 to 12 carbon atoms include methyl groups, ethyl groups, propyl groups, butyl groups, pentyl groups, hexyl groups, heptyl groups, octyl groups, nonyl groups, decyl groups, undecyl groups, and dodecyl groups, with methyl groups preferable.

Exemplary alkenyl groups which may be represented by $R^1$ in formula (I) having 2 to 12 carbon atoms include vinyl groups, allyl groups, butenyl groups, pentenyl groups, hexenyl groups, heptenyl groups, octenyl groups, nonenyl groups, decenyl groups, undecenyl groups, and dodecenyl groups, wherein alkenyl groups are preferably vinyl groups or hexenyl groups, with vinyl groups particularly preferable. Note that in formula (I), at least two $R^1$ groups are alkenyl groups, wherein the content of the alkenyl groups in terms of vinyl groups is not particularly limited as long as the composition can be cured using the same. However, the content is preferably 2.0 mass % or less, more preferably 1.0 mass % or less, and further preferably 0.5 mass % or less. This is because, if the content of alkenyl groups is greater than necessary, when the release layer for a silicone adhesive is formed using the curable silicone composition according to the present invention as a release coating agent, the release force of the release layer from the silicone adhesive layer may be high. Note that the content in terms of vinyl groups refers to the content calculated by replacing the alkenyl groups other than vinyl groups with the mass of an equimolar amount of vinyl groups.

Moreover, exemplary aryl groups in component (A) which may be represented by $R^1$ in formula (I) having 6 to 12 carbon atoms include phenyl groups, tolyl groups, and xylyl groups, with phenyl groups preferable.

Exemplary aralkyl groups which may be represented by $R^1$ in formula (I) having 7 to 12 carbon atoms include benzyl groups and phenethyl groups.

In formula (I), examples of the fluoro(poly)ether-containing organic group of $R^1$ include groups represented by the following formula (1).

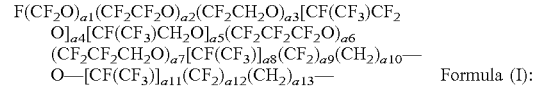
Formula (I):

(wherein, a1 to a13 are integers of 0 or more. However, at least one of a1 to a9 is an integer of 1 or more. The total of a1 to a10 is preferably 21 or less, while the total of a11 to a13 is preferably 6 or less. Moreover, repeating units in $CF_2O)_{a1}(CF_2CF_2O)_{a2}(CF_2CH_2O)_{a3}[CF(CF_3)CF_2O]_{a4}[CF(CF_3)CH_2O]_{a5}(CF_2CF_2CF_2O)_{a6}(CF_2CF_2CH_2O)_{a7}[CF(CF_3)]_{a8}(CF_2)_{a9}(CH_2)_{a10}$, as well as repeating units in $[CH(CF_3)]_{a11}(CF_2)_{a12}(CH_2)_{a13}$ may each be randomly bonded.)

The fluoro(poly)ether-containing organic group of $R^1$ is further preferably a group represented by any of the following formulas (2), (3), or (4).

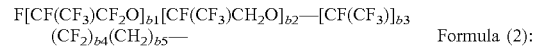
Formula (2):

(wherein, b1 to b5 are each an integer of 0 or more, b1+b2 is an integer of 1 or more, and b3+b4+b5 is an integer of 0 or more. b1+b2 is preferably 21 or less, more preferably 11 or less, and further preferably 6 or less. b3+b4+b5 is preferably 6 or less. Moreover, repeating units in [CF(CF$_3$)]$_{b3}$(CF$_2$)$_{b4}$(CH$_2$)$_{b5}$ may each be randomly bonded.)

$$F(CF_2CF_2CF_2O)_{c1}(CF_2CF_2CH_2O)_{c2}-[CF(CF_3)]_{c3}(CF_2)_{c4}(CH_2)_{c5}-  \quad \text{Formula (3):}$$

(wherein, c1 to c5 are integers of 0 or more, c1+c2 is an integer of 1 or more, and c3+c4+c5 is an integer of 0 or more. c1+c2 is preferably 21 or less, more preferably 11 or less, and further preferably 6 or less. c3+c4+c5 is preferably 6 or less Moreover, repeating units in (CF(CF$_3$))$_{c3}$(CF$_2$)$_{c4}$(CH$_2$)$_{c5}$ may each be randomly bonded.)

$$F(CF_2)_{d1}(CH_2)_{d2}-O-(CH_2)_{d3}-  \quad \text{Formula (4):}$$

(wherein, d1 and d2 are each an integer of 1 or more, while d3 is an integer of 0 or more. d1 is preferably 10 or less, while d2 and d3 are each preferably 6 or less.)

Particularly preferable fluoro(poly)ether-containing organic groups include the following groups.

F[CF(CF$_3$)CF$_2$O]$_n$CF(CF$_3$)CF$_2$O(CH$_2$)$_3$—
F[CF(CF$_3$)CF$_2$O]$_n$CF(CF$_3$)CH$_2$O(CH$_2$)$_3$—
F[CF(CF$_3$)CF$_2$O]$_{n+1}$CF(CF$_3$)(CH$_2$)$_2$—
F(CF$_2$)$_m$(CH$_2$)$_2$O(CH$_2$)$_3$—

In each of the abovementioned formulas, l is preferably 1 to 20, more preferably 1 to 10, and most preferably 1 to 5. Moreover, m is preferably 1 to 6.

Moreover, a small amount of the fluoro(poly)ether-containing organic groups may be bonded to the silicon atoms.

F[CF(CF$_3$)CF$_2$O]$_o$CF(CF$_3$)CF$_2$O—
F[CF(CF$_3$)CF$_2$O]$_o$CF(CF$_3$)CH$_2$O—
F(CF$_2$)$_p$(CH$_2$)$_2$O—

In the abovementioned formulas, o is preferably 1 to 20, more preferably 1 to 10, and most preferably 1 to 5. Moreover, p is preferably 1 to 6.

When the organopolysiloxane of formula (I) has two or more fluoro(poly)ether-containing organic groups per molecule, they may be the same or different from each other.

Specific examples of component (A1) include, but are not limited to, the following fluoro(poly)ether group-containing organopolysiloxanes. In the following formulas, Me and Vi respectively represent methyl groups and vinyl groups, while F1a, F1b, F1c, F1d, and F1e respectively represent the groups indicated below.

F1a: CF$_3$CF$_2$CF$_2$O—CF(CF$_3$)CH$_2$O(CH$_2$)$_3$—
F1b: F[CF(CF$_3$)CF$_2$O]$_2$CF(CF$_3$)CH$_2$O(CH$_2$)$_3$—
F1c: F[CF(CF$_3$)CF$_2$O]$_3$CF(CF$_3$)CH$_2$O(CH$_2$)$_3$—
F1d: F[CF(CF$_3$)CF$_2$O]$_5$CF(CF$_3$)CH$_2$O(CH$_2$)$_3$—
F1e: F[CF(CF$_3$)CF$_2$O]$_2$CF(CF$_3$)CF$_2$O(CH$_2$)$_3$— an organopolysiloxane represented by the average composition formula:

$$(Me_2ViSiO_{1/2})_2(Me_2SiO_{2/2})_{240}(Me(F1a)SiO_{2/2})_{120}$$

an organopolysiloxane represented by the average composition formula:

$$(Me_2ViSiO_{1/2})_2(Me_2SiO_{2/2})_{245}(Me(F1b)SiO_{2/2})_{120}$$

an organopolysiloxane represented by the average composition formula:

$$(Me_2ViSiO_{1/2})_2(Me_2SiO_{2/2})_{240}(Me(F1b)SiO_{2/2})_{120}(MeViSiO_{2/2})_3$$

an organopolysiloxane represented by the average composition formula:

$$(Me_3SiO_{1/2})_2(Me_2SiO_{2/2})_{240}(Me(F1b)SiO_{2/2})_{120}(MeViSiO_{2/2})_6$$

an organopolysiloxane represented by the average composition formula:

$$(Me_2ViSiO_{1/2})_2(Me_2SiO_{2/2})_{660}(Me(F1b)SiO_{2/2})_{330}(MeViSiO_{2/2})_6$$

an organopolysiloxane represented by the average composition formula:

$$(Me_2ViSiO_{1/2})_2(Me_2SiO_{2/2})_{300}(Me(F1c)SiO_{2/2})_{100}(MeViSiO_{2/2})_3$$

an organopolysiloxane represented by the average composition formula:

$$(Me_2ViSiO_{1/2})_2(Me_2SiO_{2/2})_{240}(Me(F1d)SiO_{2/2})_{120}(MeViSiO_{2/2})_3$$

an organopolysiloxane represented by the average composition formula:

$$(Me_2ViSiO_{1/2})_2(Me_2SiO_{2/2})_{245}(Me(F1e)SiO_{2/2})_{120}$$

These polysiloxanes can be manufactured by conventionally well-known methods. For example, a dichlorosilane having a fluoro(poly)ether group can be manufactured by the method proposed in JP H4-28273 B, a bis(hydridesiloxy)silane having a fluoro(poly)ether group can be manufactured by substituting chlorine atoms of a dichlorosilane with a dimethylsiloxy group using the method proposed in JP H3-197484 A, a cyclotrisiloxane substituted with a fluoro(poly)ether group can be manufactured by dehydrocondensation in a molecule using the method proposed in JP H6-321968 A, and this can be manufactured by equilibrium polymerization with a vinyl group-containing siloxane in the manner disclosed in JP S64-74268 A or by non-equilibrium polymerization via the method proposed in JP H11-246772 A.

Moreover, after the alkenyl-functional fluoro(poly)ether-modified organopolysiloxane used as component (A1) of the present invention is manufactured by subjecting a fluoro(poly)ether group-containing alkenyl ether having a stoichiometric amount or less to a hydrosilylation reaction with respect to the silicon atom-bonded hydrogen atom-containing polysiloxane to introduce a fluoro(poly)ether group, a large excess of acetylene or terminal dienes such as 1,5-hexadiene and 1,3-butadiene is subjected to a hydrosilylation reaction with respect to unreacted residual silicon atom-bonded hydrogen atoms, with the following polysiloxanes capable of being exemplified.

While not limited thereto, specific examples of component (A1) manufactured by the present method include the following fluoro(poly)ether group-containing organopolysiloxanes. In the following formulas, Me, Vi, and Hex respectively represent methyl groups, vinyl groups, and n-hexenyl groups, while F1b, F1f, and F1g respectively represent the groups indicated below.

F1b: F[CF(CF$_3$)CF$_2$O]$_2$CF(CF$_3$)CH$_2$O(CH$_2$)$_3$—
F1f: F[CF(CF$_3$)CF$_2$O]$_3$CF(CF$_3$)CH$_2$O(CH$_2$)$_3$—,
and F[CF(CF$_3$)CF$_2$O]$_4$CF(CF$_3$)CH$_2$O(CH$_2$)$_3$—
are contained at a molar ratio of 1:1
F1g: F[CF(CF$_3$)CF$_2$O]$_{10}$CF(CF$_3$)CH$_2$O(CH$_2$)$_3$— an organopolysiloxane represented by the average composition formula:

$$(Me_3SiO_{1/2})_2(Me_2SiO_{2/2})_{200}(Me(F1b)SiO_{2/2})_{100}(MeHexSiO_{2/2})_4$$

an organopolysiloxane represented by the average composition formula:

$$(Me_3SiO_{1/2})_2(Me_2SiO_{2/2})_{250}(Me(F1f)SiO_{2/2})_{110}(MeHexSiO_{2/2})_4$$

an organopolysiloxane represented by the average composition formula:

$$(Me_3SiO_{1/2})_2(Me_2SiO_{2/2})_{190}(Me(F1g)SiO_{2/2})_{30}(MeHexSiO_{2/2})_2$$

an organopolysiloxane represented by the average composition formula:

$$(Me_3SiO_{1/2})_2(Me_2SiO_{2/2})_{230}(Me(F1g)SiO_{2/2})_{35}(MeHexSiO_{2/2})_4$$

Note that the content of fluorine atoms per molecule using fluoro(poly)ether-containing organic groups is preferably no less than 30 mass %, more preferably no less than 35 mass %, and further preferably 40 mass %. This is because when the content of fluorine atoms in component (A1) is 30 mass % or more, a releasable film obtained by crosslinking the present curable silicone composition exhibits good peeling force with respect to a silicone pressure-sensitive adhesive. Note that the upper limit of the content of fluorine atoms in component (A1) is not particularly limited; however, when the content is too high, component (A1) itself tends to have lower solubility in the solvent, which impairs the handleability, so the content is preferably at most 60 mass % or at most 55 mass %.

Moreover, an example of component (A2) is an organopolysiloxane represented by the average composition formula (II):

$$(R^2{}_3SiO_{1/2})_w(R^2{}_2SiO_{2/2})_x(R^2SiO_{3/2})_y(SiO_{4/2})_z \quad (II)$$

(wherein, the $R^2$ moieties are the same or different alkyl groups having 1 to 12 carbon atoms, alkenyl groups having 2 to 12 carbon atoms, aryl groups having 6 to 12 carbon atoms, aralkyl groups having 7 to 12 carbon atoms, or fluoroalkyl groups having 1 to 12 carbon atoms; and in each molecule, at least two $R^2$ moieties are alkenyl groups and at least one $R^2$ moiety is a fluoroalkyl group having 1 to 12 carbon atoms, w is a positive number, x is a positive number, y is 0 or a positive number, and z is 0 or a positive number).

Regarding w to z in the abovementioned formula (II), w is an integer of 2 or more, preferably an integer of 2 to 6, x is an integer of 1 or more, preferably an integer of 1 to 5,000, more preferably an integer of 30 to 4,000, y is 0 or a positive number, and z is 0 or a positive number. When the degree of siloxane polymerization is less than the lower limit of the range described above, when the curable silicone composition obtained using this component is used as a release coating agent, formation of the release layer may be difficult, while when the degree of siloxane polymerization exceeds the upper limit of the range described above, the coating properties (particularly thin film applicability) of the obtained curable silicone composition may decrease.

The alkyl, alkenyl, aryl, and aralkyl groups of $R^2$ may be exemplified by groups similar to those listed as $R^1$.

Exemplary fluoroalkyl groups of $R^2$ include 3,3,3-trifluoropropyl groups, 3,3,4,4,4-pentafluorobutyl groups, 3,3,4,4,5,5,5-heptafluoropentyl groups, 3,3,4,4,5,5,6,6,6-nonafluorohexyl groups, 3,3,4,4,5,5,6,6,7,7,7-undecafluoroheptyl groups, 3,3,4,4,5,5,6,6,7,7,8,8,8-tridecafluorooctyl groups, and 3,3,4,4,5,5,6,6,7,7,8,8,9,9,9-pentadecafluorononyl groups, wherein 3,3,4,4,5,5,5-heptafluoropentyl groups, 3,3,4,4,5,5,6,6,6-nonafluorohexyl groups, 3,3,4,4,5,5,6,6,7,7,7-undecafluoroheptyl groups, or 3,3,4,4,5,5,6,6,7,7,8,8,8-tridecafluorooctyl groups are preferable.

Examples of such component (A2) include the following organopolysiloxanes. Note that in the following formulas, Me, Vi, Hex, F2a, F2b, and F2c respectively represent a methyl group, a vinyl group, an n-hexenyl group, along with a 3,3,4,4,5,5,6,6,6-nonafluorohexyl group, a 3,3,4,4,5,5,6,6,7,7,8,8,8-tridecafluoro octyl group, and a 3,3,3-trifluoro propyl group.

an organopolysiloxane represented by the average composition formula:

$$(Me_2ViSiO_{1/2})_2(Me_2SiO_{2/2})_{750}(Me(F2a)SiO_{2/2})_{750}(MeViSiO_{2/2})_{20}$$

an organopolysiloxane represented by the average composition formula:

$$(Me_3SiO_{1/2})_2(Me_2SiO_{2/2})_{450}(Me(F2a)SiO_{2/2})_{350}(MeViSiO_{2/2})_{10}$$

an organopolysiloxane represented by the average composition formula:

$$(Me_2(Fa1)SiO_{1/2})_2(Me_2SiO_{2/2})_{450}(Me(F2a)SiO_{2/2})_{350}(MeViSiO_{2/2})_{10}$$

an organopolysiloxane represented by the average composition formula:

$$(Me_2HexSiO_{1/2})_2(Me_2SiO_{2/2})_{1000}(Me(F2a)SiO_{2/2})_{1000}(MeHexSiO_{2/2})_{20}$$

an organopolysiloxane represented by the average composition formula:

$$(Me_2ViSiO_{1/2})_4(Me_2SiO_{2/2})_{500}(Me(F2a)SiO_{2/2})_{500}(SiO_{4/2})_1$$

an organopolysiloxane represented by the average composition formula:

$$(Me_2ViSiO_{1/2})_2(Me_2SiO_{2/2})_{900}(Me(F2b)SiO_{2/2})_{450}(MeViSiO_{2/2})_{10}$$

an organopolysiloxane represented by the average composition formula:

$$(Me_2ViSiO_{1/2})_2(Me_2SiO_{2/2})_{1450}(Me(F2a)SiO_{2/2})_{1100}(MeViSiO_{2/2})_5$$

an organopolysiloxane represented by the average composition formula:

$$(Me_2ViSiO_{1/2})_2(Me_2SiO_{2/2})_{1250}(Me(F2a)SiO_{2/2})_{1250}(MeViSiO_{2/2})_7$$

an organopolysiloxane represented by the average composition formula:

$$(Me_2ViSiO_{1/2})_2(Me_2SiO_{2/2})_{900}(Me(F2a)SiO_{2/2})_{450}(MeViSiO_{2/2})_{10}$$

an organopolysiloxane represented by the average composition formula:

$$(Me_2ViSiO_{1/2})_2(Me_2SiO_{2/2})_{1100}(Me(F2a)SiO_{2/2})_{400}(MeViSiO_{2/2})_7$$

an organopolysiloxane represented by the average composition formula:

$$(Me_2ViSiO_{1/2})_2(Me_2SiO_{2/2})_{1100}(Me(F2a)SiO_{2/2})_{400}(Me(F2c)SiO_{2/2})_{100}(MeViSiO_{2/2})_{10}$$

One or more selected from these can be combined and used.

Note that the content of fluorine atoms per molecule using fluoroalkyl-containing organic groups is preferably no less than 30 mass %, more preferably no less than 35 mass %, and further preferably 40 mass %. This is because when the content of fluorine atoms in component (A2) is 30 mass %, a releasable film obtained by crosslinking the present curable silicone composition exhibits good peeling force with respect to a silicone pressure-sensitive adhesive. Note that the upper limit of the content of fluorine atoms in component (A2) is not particularly limited; however, when the content is too high, component (A2) itself tends to have lower solubility in the solvent, which impairs the handleability, so the content therefore is preferably at most 60 mass % or at most 55 mass %.

The component (A1) and the component (A2) are preferably a combination of those which are not completely compatible at 25° C. when mixed in a solventless manner. The phrase of "not completely compatible at 25° C. when mixed in a solventless manner" means that when the mixture of two or more fluorine-containing organopolysiloxanes is placed in a transparent glass vial with a lid at a mass ratio of 1:1, then sufficiently stirred at 25° C., and immediately thereafter visually observed after 24 hours to be cloudy or be separated into two phases without exhibiting a uniform and transparent liquid state. Note that this means that when the fluorine-containing organopolysiloxanes is other than a gum-like or paste-like liquid at 25° C., the mixture is heated to a temperature in liquid form, sufficiently stirred and then cooled to 25° C., and immediately thereafter visually observed after 24 hours to be cloudy or to be separated into two phases without exhibiting a uniform and transparent liquid state.

Moreover, component (A2) can use a single fluoroalkyl group-containing organopolysiloxane, or a mixture of two or more fluoroalkyl group-containing organopolysiloxanes with different average composition formulas. In this case, the two or more organopolysiloxane-containing fluoroalkyl groups may or may not be compatible with each other at 25° C. when mixed in a solventless manner.

[Component (B)]

Component (B) is an organopolysiloxane having at least three silicon atom-bonded hydrogen atoms (Si—H) per molecule and is a component for curing the composition according to an embodiment of the present invention by carrying out an addition reaction using a hydrosilylation reaction with component (A).

Examples of groups bonded to silicon atoms in component (B) other than hydrogen atoms include alkyl groups having 1 to 12 carbon atoms, aryl groups having 6 to 12 carbon atoms, aralkyl groups having 7 to 12 carbon atoms, and fluoroalkyl groups having 1 to 12 carbon atoms, and fluoro(poly)ether-containing organic groups having 2 to 100 carbon atoms. Note that a small amount of hydroxyl groups or alkoxy groups may be bonded to the silicon atoms in component (B) within a range that does not impair the object of the present invention.

The molecular structure of component (B) is not limited. Examples thereof include a straight-chain structure, a branched-chain structure, a partially branched straight-chain structure, a resinous structure, and a cyclic structure, with a straight-chain structure or a partially branched straight-chain structure being preferable.

An example of such component (B) is an organopolysiloxane represented by the following average unit formula (III):

$$(R^3{}_3SiO_{1/2})_{aa}(R^3{}_2SiO_{2/2})_{ab}(R^3SiO_{3/2})_{ac}(SiO_{4/2})_{ad} \quad (III).$$

In formula (III), the $R^3$ moieties are the same or different and are independently hydrogen atoms, alkyl groups having from 1 to 12 carbon atoms, aryl groups having 6 to 12 carbon atoms, aralkyl groups having from 7 to 12 carbon atoms, fluoroalkyl groups having 1 to 12 carbon atoms, or fluoro(poly)ether-containing organic groups, provided that at least three of the $R^3$ moieties are hydrogen atoms. Moreover, aa is a positive number, ab is a positive number, ac is 0 or a positive number, and ad is 0 or a positive number. However, when aa is 2, the total of aa to ad is preferably within a range of from to 200, and is within a given combination range of upper limits and lower limits with a lower limit of 10 or 15 and an upper limit of 150, 120, 100, 80, 70, 60, 50, or 40. This is because when aa is 2 and the total of aa to ad is greater than or equal to the lower limit of the range described above, crosslinking of the present composition progresses sufficiently, while when the total is less than or equal to the upper limit of the range described above, the handleability of the present composition is favorable.

Exemplary alkyl groups having 1 to 12 carbon atoms which may be represented by $R^3$ include methyl groups, ethyl groups, propyl groups, butyl groups, pentyl groups, hexyl groups, heptyl groups, octyl groups, nonyl groups, decyl groups, undecyl groups, and dodecyl groups, with methyl groups preferable.

Moreover, exemplary aryl groups having 6 to 12 carbon atoms which may be represented by $R^3$ include phenyl groups, tolyl groups, and xylyl groups, with phenyl groups preferable.

Moreover, exemplary aralkyl groups having 7 to 12 carbon atoms which may be represented by $R^3$ include benzyl groups and phenethyl groups.

Further, the fluoroalkyl group having 1 to 12 carbon atoms which may be represented by $R^3$ is not particularly limited, with a fluoroalkyl group indicated by $R^2$ preferably used.

Moreover, as the fluoro(poly)ether-containing organic groups which may be represented by $R^3$, the fluoro(poly)ether-containing organic groups illustrated in the abovementioned $R^1$ are preferably used.

Component (B) according to the present invention may or may not have a group selected from fluoroalkyl groups and fluoro(poly)ether-containing organic groups. Even when an organohydrogenpolysiloxane having a fluorine atom-containing group is not used as component (B), when the present composition is combined with the abovementioned (A) and cured using the composition as a coating agent, a release layer having excellent releasability, particularly excellent releasability with respect to the silicone adhesive, is obtained when the composition according to the present invention is cured using the composition as a coating agent. Component (B) is particularly preferably an organohydrogenpolysiloxane represented by the abovementioned average composition formula (III), and $R^3$ is a combination of a hydrogen atom, an alkyl group (specifically, a methyl group), a fluoroalkyl group, and/or a fluoro(poly)ether-containing organic group.

When component (B) according to the present invention has a group selected from the group consisting of fluoroalkyl groups and fluoro(poly)ether-containing organic groups, the fluorine atom content derived from fluoroalkyl groups and/or fluoro(poly)ether-containing organic groups per molecule is not particularly limited, but is preferably at least mass %, at least 25 mass %, at least 30 mass %, or at least 35 mass %. Moreover, the upper limit of the fluorine atom content in component (B) is preferably at most 60 mass % or at most 50 mass %.

Specific examples of component (B) include, but are not limited to, the organopolysiloxanes listed below. In the following formulas, Me, F2a, and F1b respectively represent a methyl group, a 3,3,4,4,5,5,6,6,6-nonafluorohexyl group, and a group represented by the following formula:

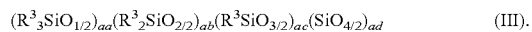
F[CF(CF$_3$)CF$_2$O]$_2$CF(CF$_3$)CH$_2$O—(CH$_2$)$_3$— an organopolysiloxane represented by the average composition formula:

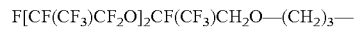
(Me$_3$SiO$_{1/2}$)$_2$(Me(F2a)SiO$_{2/2}$)$_{12}$(MeHSiO$_{2/2}$)$_{27}$ an organopolysiloxane represented by the average composition formula:

$(Me_3SiO_{1/2})_2(Me_2SiO_{2/2})_{55}(Me(F1b)SiO_{2/2})_{25}(MeHSiO_{2/2})_{25}$ an organopolysiloxane represented by the average composition formula:

$(Me_3SiO_{1/2})_2(MeHSiO_{2/2})_{50}$ an organopolysiloxane represented by the average composition formula:

$(Me_3SiO_{1/2})_2(Me_2SiO_{2/2})_{30}(MeHSiO_{2/2})_{30}$ an organopolysiloxane represented by the average composition formula:

$(Me_2HSiO_{1/2})_2(Me_2SiO_{2/2})_{30}(MeHSiO_{2/2})_{30}$

One or more selected from these can be combined and used as component (B).

The content of component (B) in the curable silicone composition according to the present invention is an amount such that the molar ratio of the silicon-bonded hydrogen atoms to the alkenyl groups in component (A) is within a range of 0.1 to 20 (silicon atom-bonded hydrogen atoms/alkenyl groups), and is preferably within a given combination range of upper limits and lower limits with a lower limit of 0.5, 0.8, or 1 and an upper limit of 18, 17, 16, 15, 14, 13, or 12. This is because when the content of component (B) is greater than or equal to the lower limit of the range described above, crosslinking of the present curable silicone composition progresses sufficiently, while when the content is less than or equal to the upper limit of the range described above, the characteristics of the resulting releasable film may be stabilized.

[Component (C)]

Component (C) is a hydrosilylation reaction catalyst for promoting curing with the hydrosilylation reaction of the curable silicone composition. Examples thereof include platinum-based catalysts, rhodium-based catalysts, and palladium-based catalysts, with platinum-based catalysts being preferable. Examples of platinum-based catalysts include platinum fine powder, platinum black, platinum supporting silica fine powder, platinum supporting activated carbon, chloroplatinic acid, alcohol solutions of chloroplatinic acid, olefin complexes of platinum, and alkenylsiloxane complexes of platinum.

The content of component (C) is an amount that promotes curing of the present curable silicone composition and is specifically an amount in which the metal atoms, preferably platinum atoms, in the catalyst are within a range of 0.1 to 1,000 ppm in mass units with respect to the present curable silicone composition. This is because, when the amount of component (C) is greater than or equal to the lower limit of the range described above, curing of the resulting curable silicone composition progresses, while when the amount is less than or equal to the upper limit of the range described above, the resulting cured product becomes less susceptible to discoloration.

[Component (D)]

Component (D) is any organic solvent capable of compatibilizing the entire composition while uniformly compatibilizing the fluorine-containing organopolysiloxane mixture serving as component (A). Here, "compatibilizing" means that turbidity is not observed in the appearance at 25° C. and a uniform and transparent liquid is provided.

Moreover, by adding an organic solvent, the viscosity of the curable silicone composition can be reduced, improving the application workability and wettability to the substrate.

Component (D), which is preferably a solvent mixture, consists of one solvent or two or more solvents selected from the group consisting of diethyl ether, dipropyl ether, diisopropyl ether, dibutyl ether, diisobutyl ether, di-sec-butyl ether, di-tert-butyl ether, methyl-tert-butyl ether, ethyl-tert-butyl ether, pentane, m-xylene hexafluoride, methylheptafluoropropyl ether, methylnonafluorobutyl ether, ethylnonafluorobutyl ether, and 3-methoxy-1,1,1,2,2,3,4,4,5,5,6,6,6-tridecafluoro hexane.

Other organic solvents may be further used in addition to the abovementioned organic solvent, provided that the appearance of the curable silicone composition can be maintained transparent and uniform at 25° C. from the preparation of the composition until the use thereof. While not particularly limited thereto, exemplary such additional organic solvents include: hydrocarbon-based solvents such as aromatic hydrocarbon-based solvents such as toluene and xylene, aliphatic hydrocarbon-based solvents such as hexane, heptane, octane, isooctane, decane, cyclohexane, methylcyclohexane, and isoparaffin, industrial gasoline (rubber solvents or the like), petroleum benzene, and solvent naphtha; ketone-based solvents such as acetone, methyl ethyl ketone, 2-pentanone, 3-pentanone, 2-hexanone, 2-heptanone, 4-heptanone, methyl isobutyl ketone, diisobutyl ketone, acetonyl acetone, and cyclohexanone; ester-based solvents such as ethyl acetate, propyl acetate, isopropyl acetate, butyl acetate, and isobutyl acetate; solvents having ester and ether components such as 2-methoxyethylacetate, 2-ethoxyethylacetate, propylene glycol monoether acetate, and 2-butoxyethylacetate; siloxane-based solvents such as hexamethyl disiloxane, octamethyl trisiloxane, octamethyl cyclotetrasiloxane, decamethyl cyclopentasiloxane, tris(trimethylsiloxy)methylsilane, and tetrakis(trimethylsiloxy) silane; fluorine modified solvents other than said m-xylene hexafluoride, methylheptafluoropropyl ether, methylnonafluorobutyl ether, ethylnonafluorobutyl ether, and 3-methoxy-1,1,1,2,2,3,4,4,5,5,6,6,6-tridecafluorohexane, for example, fluorine modified aromatic hydrocarbon based solvents such as benzotrifluoride; fluorine modified ether based solvents such as perfluoro(2-butyltetrahydrofuran); fluorine modified alkylamine based solvents such as perfluorotributylamine and perfluorotripentylamine; and mixed solvents of two or more types selected therefrom.

The content of component (D) is an amount necessary to uniformly compatibilize the entire curable silicone composition and is 10,000 parts by mass or less per 100 parts by mass of component (A), preferably within a range of 20 to 5,000 parts by mass.

Component (E)

The present curable silicone composition may also contain (E) a hydrosilylation reaction inhibitor in order to control the crosslinking reactions thereof. Examples of component (E) include: alkyne alcohols such as 1-ethynylcyclohexane-1-ol, 2-methyl-3-butyne-2-ol, 3,5-dimethyl-1-hexyne-3-ol, and 2-phenyl-3-butyne-2-ol; enyne compounds such as 3-methyl-3-pentene-1-yne and 3,5-dimethyl-3-hexene-1-yne; methyl alkenyl siloxane oligomers such as 1,3,5,7-tetramethyl-1,3,5,7-tetravinylcyclotetrasiloxane and 1,3,5,7-tetramethyl-1,3,5,7-tetrahexenylcyclotetrasiloxane; alkyneoxysilanes such as dimethyl bis(3-methyl-1-butyne-3-oxy)silane and methylvinyl bis(3-methyl-1-butyne-3-oxy) silane; alkyneoxysilane compounds such as methyltris(1-methyl-1-phenyl-propyneoxy)silane, dimethylbis(1-methyl-1-phenyl-propyneoxy)silane, methyltris(1,1-dimethyl-propyneoxy)silane, dimethylbis(1,1-dimethyl-propyneoxy) silane; and benzotriazoles.

The content of component (E) is not limited and in terms of imparting sufficient pot-life to the present curable silicone composition, the content of component (E) upon use thereof is preferably within a range of from 0.01 to 5 parts by mass, within a range of from 0.05 to 5 parts by mass, or within a range of from 0.05 to 3 parts by mass with respect to 100 parts by mass of component (A).

[Other Additives]

The present curable silicone composition may use an additive selected from a photopolymerization initiator, an antioxidant, a reactive diluent, a leveling agent, a filler, an antistatic agent, an antifoaming agent, a pigment, etc. as long as it can achieve the object of the present invention.

[Application]

The curable silicone composition according to the present invention is preferably used as a release coating agent and is suitable for use as a release coating agent for an adhesive. In particular, it is most suitable for use as a release coating agent for silicone adhesives.

The present invention also relates to a release film including: a substrate, in particular, a film-like substrate; and a release layer consisting of a cured product obtained by curing the release coating agent according to the present invention. Such a release film can be manufactured by, for example, applying the curable silicone composition according to the present invention to a film-like substrate and curing the curable silicone composition. The release film according to the present invention is particularly suitable for use as a silicone adhesive.

A film-like substrate selected from a paper or plastic film, glass, metal, etc. can be used as the substrate employed for the release film. Examples of paper include high-quality paper, coated paper, art paper, glassine paper, polyethylene laminate paper, and craft paper. Examples of plastic films include polyethylene films, polypropylene films, polyester films, polyimide films, polyvinyl chloride films, polyvinylidene chloride films, polyvinyl alcohol films, polycarbonate films, polytetrafluoroethylene films, polystyrene films, ethylene-vinyl acetate copolymer films, ethylene-vinyl alcohol copolymer films, triacetyl cellulose films, polyether ether ketone films, and polyphenylene sulfide films. The substrate on which the release layer is provided does not need to be a film-like substrate, with a substrate of any shape capable of being used. When the glass, for example, a sheet-like glass, is used as the substrate, the glass is not particularly limited in terms of thickness, type, or the like, and may be subjected to chemical reinforcement treatment or the like. In addition, glass fibers may also be used as substrates and may be used alone or in combination with another resin. Exemplary metal substrates include aluminum foil, copper foil, gold foil, silver foil, and nickel foil. If a product provided on the substrate is used as a release film, the substrate is preferably a plastic film, more preferably a polyester film. In particular, both the substrate and the release layer are preferably optically transparent.

The thickness of the release layer is preferably 2.0 μm or less, 1.0 μm or less, or 0.5 μm or less, more preferably 0.4 μm or less, and further preferably 0.3 μm or less. Moreover, the thickness is preferably 0.05 μm or more, more preferably 0.1 μm or more. This is because, if the film thickness is at the lower limit or higher of the abovementioned range, the release force of the obtained release layer is sufficiently low; in contrast, if the film thickness is at the upper limit or lower of the abovementioned range, the light transmittance of the release layer is particularly excellent.

[Laminate]

The present invention also relates to a laminate which is configured to include at least: a release layer consisting of a cured product obtained by curing the curable silicone composition according to the present invention; and an adhesive layer disposed so as to face the release layer, in particular a silicone adhesive layer. In this case, the curable silicone composition can be a release coating agent. In this case, the meaning of "facing" means that the release layer and the adhesive layer are in direct contact. Therefore, in the present invention, the release layer and the adhesive layer are generally disposed so as to face each other. In the following description, while a silicone adhesive agent is used as an example to describe the configuration of the laminate according to the present invention, the adhesive agent is not limited to the silicone adhesive.

The laminate according to the present invention may be a laminate having any structure as long as the release layer and the silicone adhesive layer are disposed so as to face each other. Specific examples of laminates are described below.

Examples of the configuration of the laminate according to the present invention include the following (a) to (d).
(a) a configuration consisting of a first substrate/release layer/silicone adhesive layer/second substrate;
(b) a configuration formed by continuously laminating two or more configuration units consisting of a substrate/release layer/silicone adhesive layer;
(c) a configuration consisting of a first substrate/first release layer/silicone adhesive layer/second release layer/second substrate; and
(d) a configuration formed by continuously laminating two or more configuration units consisting of a substrate/first release layer/silicone adhesive layer/second release layer. In configurations (b) and (d), the substrate may be discontinuous or continuous; wherein, in general, if the substrate is discontinuous, the laminate is formed into a sheet shape, while when a continuous material is used, the laminate is rolled.

The configurations (a) to (d) of the laminate will be described in further detail.

<Regarding Configuration (a)>

The laminate of configuration (a) has a configuration including a first substrate, a release layer disposed on the first substrate, a silicone adhesive layer disposed on the release layer, and a second substrate disposed on the silicone adhesive layer, wherein the release layer consists of a cured product formed by curing the release coating agent according to the present invention. The laminate of configuration (a) can be part of a laminate which includes not only the laminate itself, but also the configuration thereof. A schematic view of an example of configuration (a) is illustrated in FIG. 1.

<Regarding Configuration (b)>

Figure 2:
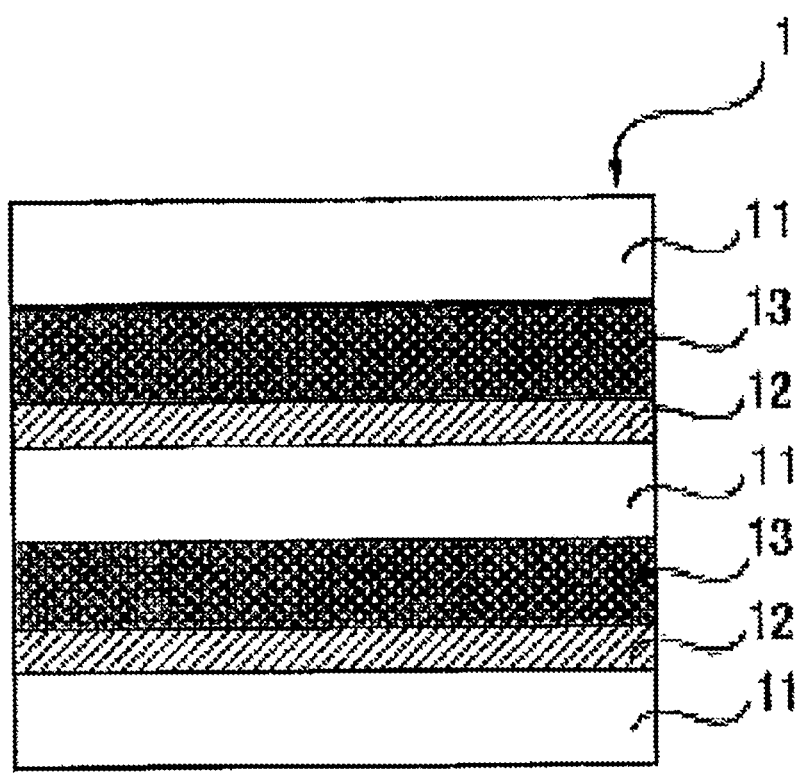
FIG. 2 is a cross sectional view illustrating one embodiment of a laminate according to the present invention.

The laminate of configuration (b) has a configuration formed by continuously laminating two or more configuration units consisting of a first substrate, a first release layer disposed on the first substrate, and a silicone adhesive layer disposed on the first release layer, wherein the release layer consists of a cured product formed by curing the release coating agent according to the present invention. Further, a new substrate is preferably disposed on the silicone adhesive layer disposed on the outermost layer of the configuration. The laminate of configuration (b) can be part of a laminate which includes not only laminate itself, but also the configuration thereof. FIG. 2 illustrates a schematic view of one example of configuration (b). In FIG. 2, there are two of the abovementioned successive configuration units, wherein a new substrate is disposed on the silicone adhesive layer disposed on the outermost layer of the configuration. However, configuration (b) is not limited to the aspect illustrated in FIG. 2.

<Regarding Configuration (c)>

Figure 3:
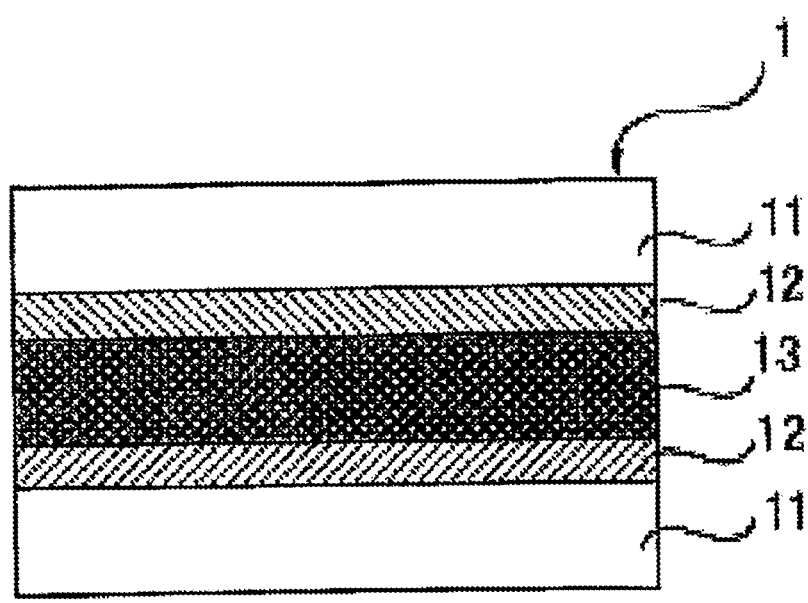
FIG. 3 is a cross sectional view illustrating one embodiment of a laminate according to the present invention.

The laminate of configuration (c) has a configuration including a first substrate, a first release layer disposed on the first substrate, a silicone adhesive layer disposed on the first release layer, a second release layer disposed on the silicone adhesive layer, and a second substrate disposed on the second release layer, wherein one or both of the first release layer and the first release layer consist(s) of a cured product formed by curing the release coating agent according to the present invention. The laminate of configuration (c) can be part of a laminate which includes not only laminate itself, but also the configuration thereof. A schematic view of one example of configuration (c) is illustrated in FIG. 3.

<Regarding Configuration (d)>

Figure 4:
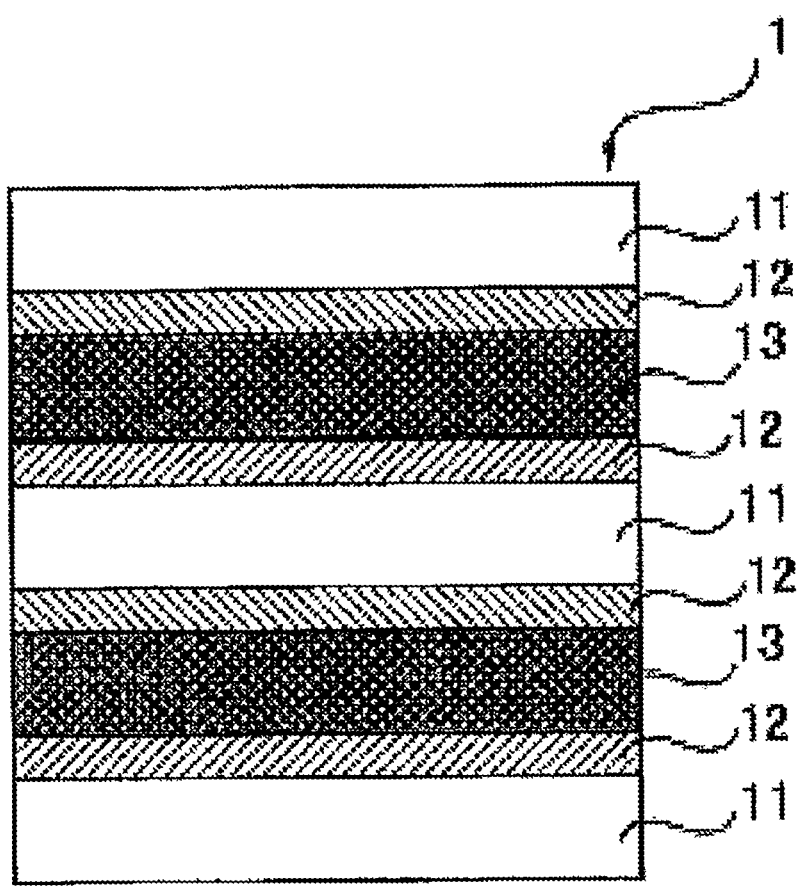
FIG. 4 is a cross sectional view illustrating one embodiment of a laminate according to the present invention.

The laminate of configuration (d) has a configuration formed by continuously laminating two or more configuration units consisting of a first substrate, a first release layer disposed on the first substrate, a silicone adhesive layer disposed on the first release layer, and a second release layer disposed on the silicone adhesive layer, wherein one or both of the first release layer and the second release layer consist(s) of a cured product formed by curing the release coating agent according to the present invention. Further, a new substrate is preferably disposed on the release layer disposed on the outermost layer of the configuration. The laminate of configuration (d) can be part of a laminate which includes not only laminate itself, but also the configuration thereof. FIG. 4 illustrates a schematic view of one example of configuration (d). In FIG. 4, there are two of the abovementioned successive configuration units, wherein a new substrate is disposed on the release layer disposed on the outermost layer of the configuration. However, configuration (b) is not limited to the aspect illustrated in FIG. 4.

In configurations (b) and (d) of the abovementioned laminate, if the substrate is discontinuous (sheet shaped), all of the substrate, the release layer, and the silicone adhesive layer may be the same or different from each other, including in terms of types and thicknesses. Moreover, when the substrate is continuous (roll shaped), the substrate, the silicone adhesive layer, and the one or two release layers are each identical.

Such a substrate is preferably sheet-like or film-like and is particularly preferably a film-like substrate, with a substrate similar to the substrate used in the release film capable of being used.

Moreover, such a substrate which is light transmissive or light non-transmissive may be used, and if multiple substrates are used, both light transmissive and light non-transmissive ones may be optionally combined depending on the purpose.

The laminate according to the present invention preferably has a roll shape, for example, a roll shape wound on an appropriate cylindrical or tubular core.

In the laminate of the present invention, the configuration (for example, corresponding to configuration (c) or (d)) is a configuration in which a first release layer is disposed so as to face one surface of both surfaces with respect to the silicone adhesive layer, and a second release layer is disposed so as to face the other surface, wherein at least one of the first release layer and the second release layer must be a release layer consisting of a cured product formed by curing the release coating agent according to the present invention, and wherein a release force (F1) upon releasing the silicone adhesive from the first release layer preferably differs from a release force (F2) upon releasing the silicone adhesive from the second release layer.

When the difference in the release force between F1 and F2 is small, after the operation of releasing one of the release layers from the silicone adhesive layer (releasing the first facing surface), upon releasing the first opposing surface in the operation of releasing the other release layer (second facing surface), the second facing surface may be unintentionally released, as a result of which the silicone adhesive layer may be broken, making it difficult to be used as the originally intended adhesive. The release force difference is preferably 10 gf/inch or more, more preferably 20 gf/inch or more.

Examples of the method for achieving the abovementioned release force difference include a method for selecting a method for forming the facing surfaces as described below, a method for making two types of release layers different, etc.

In the laminate according to the present invention, the thickness of the release layer is independently 2.0 μm, 1.0 μm, or 0.5 μm or less, more preferably 0.4 μm or less, and further preferably 0.3 μm or less. Moreover, the thickness is preferably 0.05 μm or more, more preferably 0.1 μm or more. This is because, if the film thickness of the release layer is at the lower limit or higher of the abovementioned range, the release force of the release layer from the silicone adhesive is sufficiently low; in contrast, if the film thickness is at the upper limit or lower of the abovementioned range, the light transmittance of the release layer is particularly excellent and the economics thereof are also excellent.

The silicone adhesive composition or the curable silicone adhesive composition which can be used in the laminate according to the present invention is not limited to a specific substance, with those that conform to any desired laminate application, for example, any application as an adhesive tape capable of being used; however, an adhesive having a relatively high adhesive force is preferably used.

The curing mechanism of the curable silicone adhesive is not particularly limited, with hydrosilylation curability, peroxide curability, photocuring, etc. used. However, curing at a relatively low temperature can be carried out and the effects of heat on the substrate and the application material can be reduced, with hydrosilylation curing properties having excellent economics including ease of step preferably used.

A commercially available composition may be used as the silicone pressure-sensitive adhesive composition. As such a silicone pressure-sensitive adhesive, hydrosilylation curable SD 4580 PSA, SD 4584 PSA, and SD 4585 PSA, etc. manufactured by Dow Corning Toray Co., Ltd. can be used. Moreover, a silicone adhesive agent which has large elongation at break is preferably used with the storage modulus at low temperatures kept lower wherein, in assembling applications, particularly OCA applications, high adhesion and high flexibility may be required in a wider temperature range including low temperatures, such that the glass transition temperature of the cured adhesive composition is low; for example, the composition can be designed to be room temperature or lower. Examples thereof include silicone adhesive compositions proposed by the present applicant in WO 2017/188308, etc.

While not particularly limited thereto, the thickness of the silicone adhesive layer of the laminate according to the present invention is preferably 0.1 to 300 μm, more preferably 0.5 to 200 μm.

Moreover, in the laminate according to the present invention, the silicone adhesive layer can be formed on the entire surface of the layer or on only a portion of the surface thereof. Although no particular limitations are placed on aspects in which the silicone adhesive layer is formed only on a portion of the surface, silicone adhesive agents may be applied so as to form any shape such as one or more points, one or more straight lines or curved lines, and concentric circles. While the release layer may be formed on the entire surface configuring the release layer, the release layer may also be formed in accordance with the shape of the silicone adhesive formed on the silicone adhesive layer.

[Manufacturing Method of Laminate]

While the method for manufacturing the laminate according to the present invention is not particularly limited, some preferable methods are listed below.

First, the following two methods are exemplified as methods for preparing the facing surfaces of the silicone adhesive layer and the release layer in manufacturing the laminate according to the present invention.

<Method (1) for Preparing the Facing Surfaces of the Silicone Adhesive Layer and the Release Layer>

The first method for preparing the facing surface includes:
  Step (1) involving forming a first release film including a first release layer by applying and curing a release coating agent consisting of the curable silicone composition according to the present invention on a film-like substrate;
  Step (2) involving forming a silicone adhesive layer by applying and curing a curable silicone adhesive composition on a film-like substrate that is the same as the film-like substrate or a second film-like substrate that is different from the film-like substrate; and
  Step (3) involving adhering together the release layer of the first release film obtained by the aforementioned step (1) on the silicone adhesive layer obtained by step (2).

The preparation method is a method in which a previously cured release layer and a previously cured silicone adhesive layer are brought into contact with each other to form facing surfaces of both layers.

<Method (2) for Preparing the Facing Surfaces of the Silicone Adhesive Layer and the Release Layer>

The second method for preparing the facing surface includes:
  Step (1) involving forming a first release film including a first release layer by applying and curing a release coating agent consisting of the curable silicone composition according to the present invention on a film-like substrate;
  Step (2) involving forming a silicone adhesive layer by applying and curing a curable silicone adhesive composition on the first release film obtained by step (1); and
  Step (3) involving adhering together a film-like substrate that is the same as or different from the film substrate on the silicone adhesive layer obtained by step (2).

The preparation method is a method in which a curable silicone adhesive is applied and cured on a previously cured release layer to form facing surfaces of both layers. In general, compared to the first method, the second method often has a high release force difference between the silicone adhesive and the release agent.

Next, the manufacturing methods are exemplified for configuration examples (a) to (d) of the abovementioned laminate according to the present invention. Of these, the facing surfaces of the silicone adhesive and the release agent are appropriately used in the abovementioned preparation method (1) or (2) of facing surfaces.

<Configuration (a) Corresponding to a Single Layer on One Side, for Example, a Sheet Shape>

The abovementioned method (1) or (2) for preparing the facing surfaces of the silicone adhesive layer and the release layer in the manufacturing method of configuration (1) can be applied as is. While not limited thereto, the method is described with reference to a sheet laminate.

<Configuration (b), Corresponding to a Single Sided Multilayer, for Example, a Sheet or Roll Shape>

One aspect of configuration (b) can be manufactured, for example, via a manufacturing method including the following steps (1) to (3):
  Step (1) involving forming a release film including a release layer by applying and curing a release coating agent consisting of the curable silicone composition according to the present invention on a film-like substrate;
  Step (2) involving forming a silicone adhesive layer on the film substrate by applying and curing a curable silicone adhesive composition on a surface opposite the release film of the release layer; and
  Step (3) involving further adhering together the silicone adhesive layer and the release layer on both ends of this laminate.

While the above relates to the sheet laminate, step (3) can also be performed by winding the laminate formed via steps (1) and (2) into a roll shape. Step (3) may also be a step in which two or more laminates produced by steps (1) and (2) can be adhered together to form a rolled laminate. When the outermost surface of the roll is a silicone adhesive layer, the release film is preferably laminated further on the outer side thereof.

<Configuration (c) Corresponding to a Double Sided Single Layer, for Example, a Sheet Shape>

One aspect of configuration (c) can be manufactured, for example, via a manufacturing method including the following steps (1) to (4):
  Step (1) involving forming a first release film including a first release layer by applying and curing a release coating agent consisting of the curable silicone composition according to the present invention on a film-like substrate;
  Step (2) involving forming a silicone adhesive layer on the first release layer by applying and curing a curable silicone adhesive composition on the first release layer of the first release film;
  Step (3) involving forming a second release film with a second release layer by applying and curing a release coating agent consisting of a curable silicone composition according to the present invention, which is the same as or different from that used to form the first release layer, on a second film-like substrate that is the same as the film-like substrate or a second film-like substrate that is different from the film-like substrate; and
  Step (4) involving adhering together the second release layer of the second release film obtained by the abovementioned step (3) on the silicone adhesive layer obtained by step (2).

<Configuration (d), Corresponding to a Double Sided Multilayer, for Example, a Sheet or Roll Shape>

One aspect of configuration (b) can be manufactured, for example, via a manufacturing method including the following steps (1) to (4):

Step (1) involving forming a first release film including a first release layer by applying and curing a release coating agent consisting of the curable silicone composition according to the present invention on a film-like substrate;

Step (2) involving forming a release film with first and second release layers by applying and curing a release coating agent consisting of a curable silicone composition according to the present invention, which is the same as or different from that used to form the first release layer, on a surface opposite the first release film of the first release layer;

Step (3) involving forming a silicone adhesive layer on the first (or second) release layer by applying and curing a curable silicone adhesive composition on the first (or second) release layer; and Step (4) involving further adhering together the silicone adhesive layer and the second (or first) release layer on both ends of this laminate.

While the above relates to the sheet laminate, step (4) can also be performed by winding the laminate formed via steps (1), (2), and (3) into a roll shape. Step (4) can also form a rolled laminate by adhering together two or more laminates produced in steps (1), (2), and (3). When the outermost surface of the roll is a silicone adhesive layer, the release film is preferably laminated further on the outer side thereof.

Further, in the laminate according to the present invention, the silicone adhesive layer itself can also be configured by a laminate including a silicone adhesive layer on both surfaces of the substrate. In this case, the same or different two silicone adhesive layers can be used.

Such a laminate including a silicone adhesive layer having a laminate structure can be manufactured via a method including the following steps (1) to (6).

Step (1) involving forming a first release film including a first release layer by applying and curing a release coating agent consisting of the curable silicone composition according to the present invention on a film-like substrate;

Step (2) involving forming a first silicone adhesive layer by applying and curing a curable silicone adhesive composition on a film-like substrate that is the same as or different from the film-like substrate;

Step (3) involving adhering together the release layer of the first release film obtained by the aforementioned step (1) on the first silicone adhesive layer obtained by step (2);

Step (4) involving forming a second release film with a second release layer by applying and curing a release coating agent consisting of a curable silicone composition according to the present invention, which is the same as or different from that used to form the first release layer, on a film-like substrate that is the same as or different from the film-like substrate; and Step (5) involving applying and curing a curable silicone adhesive composition, which is the same as or different from the silicone adhesive composition, on the surface (the surface of the substrate) opposite the surface in which the silicone adhesive layer is provided in step (2), to form a second silicone adhesive layer;

Step (6) involving adhering together the release layer of the second release film obtained by the aforementioned step (4) on the second silicone adhesive layer obtained by step (5).

The conditions for each of the abovementioned steps are not particularly limited as long as the curable silicone composition and the curable silicone adhesive composition can be respectively cured to form the desired release layer and adhesive layer. Moreover, the curing conditions of those curable compositions are well known to those skilled in the art, with optimal conditions capable of being selected without excessive trial and error.

In addition to the abovementioned method for manufacturing the laminate, the laminate according to the present invention can be manufactured by sequentially creating each layer on a substrate, or by adhering together parts separately created on two substrates, wherein the method can be easily considered by those skilled in the art based on common technical knowledge.

EXAMPLES

Hereinafter, while the curable silicone composition and release film according to the present invention will be described in more detail based on examples, the present invention is not limited to these examples. Note that in the below-mentioned average composition formula, the symbol Me represents a methyl group, while Vi represents a vinyl group. Moreover, the method for determining the release force upon releasing the silicone adhesive from the release film as well as the adhesion retention ratio (also referred to as the residual adhesion ratio) of the silicone adhesive after releasing the release film is as described below.

<Reference Example 1> Preparation of the "Hydrosilylation Curable Silicone Adhesive Composition Solution 1"

100.0 parts by mass of a hydrosilylation curable adhesive SD 4580 PSA (solid content: 60 mass %) available from Dow Toray Co., Ltd.; 0.9 parts by mass of NC-25 CATALYST (platinum metal-containing hydrosilylation reaction catalyst) available from the same company; and 50.0 parts by mass of toluene were sufficiently mixed to prepare a uniform solution.

<Reference Example 2> Preparation of the "Hydrosilylation Curable Silicone Adhesive Composition Solution 2"

100.0 parts by mass of a hydrosilylation curable adhesive DOWSIL™ 7657ADHESIVE (solid content: 56 mass %) available from The Dow Chemical Company; 0.42 parts by mass of 4000 CATALYST (platinum metal-containing hydrosilylation reaction catalyst) available from the same company; and 33.3 parts by mass of toluene were sufficiently mixed to prepare a uniform solution.

<Method for Determining Release Force 1>

The curable silicone release agent composition was applied on a polyethylene terephthalate (hereinafter, abbreviated as a PET) film (available from Toray Industries, Inc., product name: Lumirror (trade name) S10, thickness: 50 μm) so as to give a thickness of the release agent layer of 0.2 μm after curing using a Meyer Bar, then cured by heating for 3 minutes at 150° C. to create a "release film 1" having a cured silicone release layer. The "hydrosilylation curable silicone adhesive composition solution 1" of the abovementioned reference example was applied on the release layer of the "release film 1" using an applicator so as to give a film thickness of 50 μm after curing, then cured by heating for 6 minutes at 160° C. to form a silicone adhesive layer. The PET film was adhered together on the obtained silicone adhesive layer using a 2 kg hand roller. The obtained film was cut to a width of 1 inch, after which the "release film 1"

was pulled at a speed of 1.0 m/minute in the 180° direction using a tensile tester (RTC-1210 available from Orientec Co., Ltd.), and the force (release force 1) required to release the "release film 1" from the silicone adhesive layer at 25° C. was determined.

<Method for Determining Residual Adhesion Ratio 1>

A silicone adhesive layer of a test piece consisting of the PET film substrate and the silicone adhesive layer after the determination of release force 1 described above was adhered together on a 2 mm thick polymethyl methacrylate (hereinafter abbreviated as a PMMA) plate using a 2 kg hand roller. Subsequently, the silicone adhesive layer was pulled with the PET film substrate at a speed of 0.3 m/minute in the 180° direction and the force (adhesive force F1) required to release the silicone adhesive from the PMMA plate at 25° C. was determined.

Separately, the "hydrosilylation curable silicone adhesive composition solution 1" obtained in the abovementioned Reference Example 1 was applied on the PET film using an applicator so as to give a film thickness of 50 μm after curing, then cured by heating for 6 minutes at 160° C. to form a silicone adhesive layer. The film was cut to a width of 1 inch and the adhesive layer was adhered together on the same PMMA plate as described above using a 2 kg hand roller. Subsequently, the silicone adhesive layer was pulled with the PET film at a speed of 0.3 m/minute in the 180° direction and the force (adhesive force F2) required to release the silicone adhesive layer from the PMMA plate at 25° C. was determined. The residual adhesion ratio 1 was determined from the adhesive strength F1 and the adhesive force F2 according to the following formula.

$$\text{Residual adhesion ratio 1(\%)} = (\text{adhesive force } F1/\text{adhesive force } F2)*100(\%)$$

<Method for Determining the Release Force 2>

The hydrosilylation curable silicone release agent composition solution was applied on the PET film so as to give a thickness of the release agent layer of 0.2 μm after curing using a Meyer Bar, then cured by heating for 3 minutes at 150° C. in order to create "release film 2" having a cured silicone release layer.

Separately, the hydrosilylation curable silicone adhesive composition solution obtained in the abovementioned reference example was applied on the PET film using an applicator so as to give a film thickness of 50 μm after curing, then cured by heating for 6 minutes at 160° C. The "release film 2" was adhered together on this adhesive layer using a 2 kg hand roller. This film was cut to a width of 1 inch, after which the "release film 2" was pulled at a speed of 1.0 m/minute in the 180° direction using a tensile tester, and the force (release force 2) required to release the release film 2 from the silicone adhesive layer at 25° C. was determined.

<Method for Determining Residual Adhesion Ratio 2>

An adhesive layer of a test piece consisting of the PET film substrate and the silicone adhesive layer after the determination of release force 2 described above was adhered together on a 2 mm thick PMMA plate using a 2 kg hand roller. Subsequently, the silicone adhesive layer was pulled with the PET film substrate at a speed of 0.3 m/minute in the 180° direction and the force (adhesive force F3) required to release the silicone adhesive layer from the PMMA plate at 25° C. was determined. The residual adhesion ratio 2 was determined from the adhesive force F2 determined in the determination of the adhesive force F3 and the residual adhesion ratio 1 according to the following formula.

$$\text{Residual adhesion ratio 2(\%)} = (\text{adhesive force } F3/\text{adhesive force } F2)*100(\%)$$

<Method for Determining the Release Force 3>

The curable silicone release agent composition was applied on a polyethylene terephthalate (hereinafter, abbreviated as a PET) film (available from Toray Industries, Inc., product name: Lumirror (trade name) S10, thickness: 50 μm) so as to give a thickness of the release agent layer of 0.2 μm after curing using a Meyer Bar, then cured by heating for 3 minutes at 150° C. to create release film 3" having a cured silicone release layer. The "hydrosilylation curable silicone adhesive composition solution 2" of the abovementioned reference example was applied on the release layer of "release film 3" using an applicator so as to give a film thickness of 50 μm after curing, then cured by heating for 5 minutes at 140° C. to form a silicone adhesive layer. The PET film was adhered together on the obtained silicone adhesive layer using a 2 kg hand roller. The obtained film was cut to a width of 1 inch, after which "release film 3" was pulled at a speed of 0.3 m/minute in the 180° direction using a tensile tester (RTC-1210 available from Orientec Co., Ltd.), and the force (release force 3) required to release the "release film 3" from the silicone adhesive layer at 25° C. was determined.

<Method for Determining Residual Adhesion Ratio 3>

A silicone adhesive layer of a test piece consisting of the PET film substrate and the silicone adhesive layer after the determination of the release force 3 described above was adhered together on a 2 mm thick polymethyl methacrylate (hereinafter abbreviated as a PMMA) plate using a 2 kg hand roller. Subsequently, the silicone adhesive layer was pulled with the PET film substrate at a speed of 0.3 m/minute in the 180° direction and the force (adhesive force F4) required to release the silicone adhesive from the PMMA plate at 25° C. was determined.

Separately, the "hydrosilylation curable silicone adhesive solution 2" obtained in the abovementioned Reference Example 2 was applied on the PET film using an applicator so as to give a film thickness of 50 μm after curing, then cured by heating for 5 minutes at 140° C. to form a silicone adhesive layer. The film was cut to a width of 1 inch and the adhesive layer was adhered together on the same PMMA plate as described above using a 2 kg hand roller. Subsequently, the silicone adhesive layer was pulled with the PET film at a speed of 0.3 m/minute in the 180° direction and the force (adhesive force F5) required to release the silicone adhesive layer from the PMMA plate at 25° C. was determined. Residual adhesion ratio 3 was determined from the adhesive strength F4 and the adhesive force F5 according to the following formula.

$$\text{Residual adhesion ratio 3(\%)} = (\text{adhesive force } F4/\text{adhesive force } F5)*100(\%)$$

<Method for Determining the Release Force 4>

The hydrosilylation curable silicone release agent composition solution was applied on the PET film so as to give a thickness of the release agent layer of 0.2 μm after curing using a Meyer Bar, then cured by heating for 3 minutes at 150° C. to create "release film 4" having a cured silicone release layer.

Separately, the hydrosilylation curable silicone adhesive composition solution 2 obtained in the abovementioned reference example was applied on the PET film using an applicator so as to give a film thickness of 50 μm after curing, then cured by heating for 5 minutes at 140° C. The "release film 4" was adhered together on this adhesive layer using a 2 kg hand roller. This film was cut to a width of 1 inch, after which "release film 4" was pulled at a speed of 0.3 m/minute in the 180° direction using a tensile tester and the force (release force 4) required to release the release film 4 from the silicone adhesive layer at 25° C. was determined.

<Method for Determining Residual Adhesion Ratio 4>

An adhesive layer of a test piece consisting of the PET film substrate and the silicone adhesive layer after the determination of the release force 4 described above was adhered together on a 2 mm thick PMMA plate using a 2 kg hand roller. Subsequently, the silicone adhesive layer was pulled with the PET film substrate at a speed of 0.3 m/minute in the 180° direction and the force (adhesive force F6) required to release the silicone adhesive layer from the PMMA plate at 25° C. was determined. The residual adhesion ratio 4 was determined from the adhesive force F5 determined in the determination of the adhesive force F6 and the residual adhesion ratio 3 according to the following formula.

Residual adhesion ratio 4(%)=(adhesive force $F6$/adhesive force $F5$)*100(%)

[Examples 1 to 10] and [Comparative Examples 1 to 3]

Using the following components, each component was uniformly mixed in the compositions indicated in Tables 1 and 2 to prepare curable silicone compositions of Examples 1 and 10 and Comparative Examples 1 and 2. Note that in the formula, Me, Vi, Fp, and Pf respectively represent methyl groups, vinyl groups, $F(CF(CF_3)CF_2O)_2(CF(CF_3))(CH_2)O(CH_2)_3$-groups, and 3,3,4,4,5,5,6,6,6-nonafluorohexyl groups.

The following component was used as component (A).
(a1) an organopolysiloxane represented by the average composition formula:

$$(Me_2ViSiO_{1/2})_2(Me_2SiO_{2/2})_{245}(MeFpSiO_{2/2})_{120}$$

having a vinyl group content of 0.06 mass % and a fluorine atom content of 44 mass % (a2-1) an organopolysiloxane represented by the average composition formula:

$$(Me_3SiO_{1/2})_2(Me_2SiO_{2/2})_{440}(MePfSiO_{2/2})_{330}(MeViSiO_{2/2})_{10}$$

having a vinyl group content of 0.20 mass % and a fluorine atom content of 42 mass % (a2-2) an organopolysiloxane represented by the average composition formula:

$$(Me_2ViSiO_{1/2})_2(Me_2SiO_{2/2})_{900}(MePfSiO_{2/2})_{450}(MeViSiO_{2/2})_{10}$$

having a vinyl group content of 0.16 mass % and a fluorine atom content of 37.5 mass %

The following component was used as component (B).
(b1) an organopolysiloxane represented by the average composition formula:

$$(Me_3SiO_{1/2})_2(Me_2SiO_{2/2})_{55}(MeFpSiO_{2/2})_{25}(MeHSiO_{2/2})_{25}$$

having a fluorine atom content of 40 mass % and a silicon atom-bonded hydrogen atom content of 0.12 mass %
(b2) an organopolysiloxane represented by the average composition formula:

$$(Me_3SiO_{1/2})_2(MePfSiO_{2/2})_{12}(MeHSiO_{2/2})_{27}$$

having a fluorine atom content of 38 mass % and a silicon atom-bonded hydrogen atom content of 0.50 mass %
(c) a 1,3-divinyl-1,1,3,3-tetramethyldisiloxane platinum complex (amount of platinum metal that was 270 ppm relative to the amount of solid content in the curable composition) was used as component (C).
(d1) a diisopropyl ether and (d2) an ethyl nonafluorobutyl ether (Novec 7200 available from 3M Japan Limited) were used as component (D).

[Mixing Test]

When the abovementioned components (a1) and (a2-1) were placed in a transparent glass vial with a lid at a mass ratio of 1:1 and sufficiently stirred and mixed at 25° C., the appearance of the mixture was cloudy and not uniformly transparent. After the mixture was left to stand at 25° C. for 24 hours, when the appearance was visually observed again, the mixture remained cloudy. Next, when the same operation was carried out using the abovementioned component (a2-2) instead of the abovementioned component (a2-1), the appearance immediately after mixing was cloudy and not uniformly transparent. Moreover, the appearance of the mixture after being left to stand at 25° C. for 24 hours still remained cloudy. Note that the abovementioned components (a1), (a2-1), and (a2-2) are each independently a transparent liquid at 25° C.

A curable silicone composition was prepared according to the composition indicated in Tables 1 and 2 below and was used as a release coating agent to prepare the release film according to the abovementioned method so as to determine the release force upon releasing the release film from the silicone adhesive layer as well as the residual adhesion ratio of the silicone adhesive layer to the PMMA plate after releasing the release film.

The curable silicone composition serving as the release coating agent of Examples 1 to 10 was uniformly transparent at 25° C. Moreover, in each composition of Examples 1 to 10 indicated in Table 1, when components (a1), (a2-1), (a2-2), (b1), (b2), (c), and diisopropyl ether of component (d1) were mixed so as to give a solid content concentration of 10 wt. % and sufficiently stirred at 25° C., the appearance of the obtained mixture was uniform and transparent. That is, even if there is no component (d2), a uniform and transparent composition can be prepared.

TABLE 1

Compositions and evaluation results of the curable silicone compositions of Example 1 to 10

| Component | Units of component amount | Example 1 | Example 2 | Example 3 | Example 4 | Example 5 | Example 6 |
|---|---|---|---|---|---|---|---|
| (A) (a1) | parts by mass | 3.5 | 5.3 | 8.8 | 17.9 | 36.7 | 10.4 |
| (a2-1) | parts by mass | 96.5 | 94.7 | 91.2 | 82.1 | 63.3 | 89.6 |
| (a2-2) | parts by mass | 0 | 0 | 0 | 0 | 0 | 0 |

TABLE 1-continued

Compositions and evaluation results of the curable silicone compositions of Example 1 to 10

| Component | | Units of component amount | Example 1 | Example 2 | Example 3 | Example 4 | Example 5 | Example 6 |
|---|---|---|---|---|---|---|---|---|
| (B) | (b1) | parts by mass | 0.2 | 0.3 | 0.5 | 1.0 | 2.0 | 0.6 |
| | (b2) | parts by mass | 7.7 | 7.6 | 7.3 | 6.6 | 5.1 | 7.2 |
| (C) | (c) | ppm | 270 | 270 | 270 | 270 | 270 | 270 |
| (D) | (d1) | parts by mass | 869 | 853 | 821 | 739 | 570 | 2736 |
| | (d2) | parts by mass | 3656 | 3704 | 3710 | 3803 | 4205 | 0 |
| SiH/Vi molar ratio | | | 5.0 | 5.0 | 5.1 | 5.0 | 4.8 | 5.2 |
| Determination method and determination results | | | | | | | | |
| Release force 1 | | gf/inch | 138 | 76 | 46 | 53 | 65 | 55 |
| Release force 2 | | gf/inch | 18 | 15 | 25 | 18 | 11 | 16 |
| Residual adhesion ratio 1 | | % | 96 | 99 | 96 | 94 | 90 | 99 |
| Residual adhesion ratio 2 | | % | 98 | 97 | 94 | 94 | 93 | 95 |

TABLE 2

| Component | | Units of component amount | Example 7 | Example 8 | Example 9 | Example 10 |
|---|---|---|---|---|---|---|
| (A) | (a1) | parts by mass | 4.9 | 9.8 | 19.7 | 29.6 |
| | (a2-1) | parts by mass | 0 | 0 | 0 | 0 |
| | (a2-2) | parts by mass | 95.1 | 90.2 | 80.3 | 70.4 |
| (B) | (b1) | parts by mass | 0 | 0 | 0 | 0 |
| | (b2) | parts by mass | 5.8 | 5.5 | 5.3 | 5.0 |
| (C) | (c) | ppm | 270 | 270 | 270 | 270 |
| (D) | (d1) | parts by mass | 2652 | 2654 | 2659 | 2664 |
| | (d2) | parts by mass | 0 | 0 | 0 | 0 |
| SiH/Vi molar ratio | | | 5.0 | 5.0 | 5.1 | 5.1 |
| Determination method and determination results | | | | | | |
| Residual adhesion ratio 3 | | gf/inch | 43 | 30 | 39 | 38 |
| Release force 4 | | gf/inch | 9 | 8 | 9 | 10 |
| Residual adhesion ratio 3 | | % | 94 | 92 | 93 | 95 |
| Residual adhesion ratio 4 | | % | 97 | 96 | 95 | 95 |

TABLE 3

Table 2: Compositions and evaluation results of the curable silicone compositions of Comparative Examples 1 to 3

| Component | | Units of component amount | Comparative Example 1 | Comparative Example 2 | Comparative Example 3 |
|---|---|---|---|---|---|
| (A) | (a1) | parts by mass | 100 | — | — |
| | (a2-1) | parts by mass | — | 100 | — |
| | (a2-2) | parts by mass | — | — | 100 |
| (B) | (b1) | parts by mass | 5.5 | — | — |
| | (b2) | parts by mass | — | 8.0 | 3.8 |
| (C) | (c) | ppm | 270 | 270 | 270 |
| (D) | (d1) | parts by mass | — | 900 | 2600 |
| | (d2) | parts by mass | 5213 | 3620 | — |
| SiH/Vi molar ratio | | | 3.0 | 5.1 | 3.0 |
| Determination method and determination results | | | | | |
| Release force 1 | | gf/inch | 95 | 150 | — |
| Release force 2 | | gf/inch | 10 | 30 | — |
| Residual adhesion ratio 3 | | gf/inch | 95 | — | 450 |
| Release force 4 | | gf/inch | 15 | — | 19 |
| Residual adhesion ratio 1 | | % | 91 | 100 | — |
| Residual adhesion ratio 2 | | % | 91 | 96 | — |
| Residual adhesion ratio 3 | | % | 90 | — | 100 |
| Residual adhesion ratio 4 | | % | 91 | — | 97 |

The curable silicone compositions of Examples 2 to 8 containing the fluoropolyether-modified organopolysiloxane and the fluoroalkyl group-containing organopolysiloxane achieves lower release force, particularly release force 1, than Comparative Examples 1 and 2. In contrast, compared to Comparative Example 1, while the curable silicone composition of Example 1 had slightly higher release force, the residual adhesive force of the silicone adhesive after releasing the release film in Example 1 was superior and the balance of these properties when actually used in Example 1 was superior. Moreover, when Examples 2 to 8 and Comparative Example 1 were compared, both the release force and the residual adhesive force were superior in Examples 2 to 8. Moreover, both of the release forces 1 and 2 of the curable silicone compositions of Examples 7 to 10 achieved a lower release force compared to Comparative Examples 1 and 3. Moreover, both of the residual adhesion ratios 3 and 4 of Example 7 to 10 achieved higher values than Comparative Example 1.

When Comparative Example 2 and Examples 1 to 8 containing only the fluoroalkyl group-containing organopolysiloxane were compared, Comparative Example 2 had comparable or slightly superior residual adhesive force than Examples 2 to 8; however, the release force was superior in Example 1 to 8 and the practically important balance between the release force and residual adhesive force was superior in Examples 1 to 8 to that of Comparative Example 2. In particular, Example 2 to 8 had much lower release force than Comparative Example 2, in addition to maintaining a higher retention rate of the residual adhesive force. Moreover, when Comparative Example 3 and Example 7 to were compared, Comparative Example 3 had a higher residual adhesive force but much lower release force. In any event, the release sheets of Examples 1 to 10 have the characteristics of having a low release force to the adhesive when used as a release sheet for a silicone adhesive, along with a high residual adhesive force even after the release sheet is released from the silicone adhesive, in addition to having excellent properties for practical use.

INDUSTRIAL APPLICABILITY

Because the release film including the release layer formed using the curable silicone composition according to the present invention as a release coating agent for a silicone adhesive has properties of being able to release the release film from the silicone adhesive via weak force, in addition to maintaining the high adhesive force of the silicone adhesive after releasing the release film, the curable silicone composition according to the present invention is useful as a release coating agent for a release film for a silicone adhesive.

DESCRIPTION OF THE REFERENCE NUMERALS

1 Laminate body
11 Substrate
12 Release layer
13 Adhesive layer

The invention claimed is:

1. A curable silicone composition, comprising:
(A) a fluorine-containing organopolysiloxane mixture obtained by mixing the following components (A1) and (A2) at a mass ratio of 1/99 to 45/55; 45/55:
(A1) a fluoro(poly)ether modified organopolysiloxane having at least two alkenyl groups per molecule along with a fluoro(poly)ether-containing organic group;
(A2) a fluoroalkyl group-containing organopolysiloxane having at least two alkenyl groups per molecule along with a fluoroalkyl group having 1 to 12 carbon atoms;
(B) an organopolysiloxane having at least three silicon atom-bonded hydrogen atoms per molecule;
(C) a hydrosilylation reaction catalyst; and
(D) an organic solvent.

2. The curable silicone composition according to claim 1, wherein component (A) comprises components (A1) and (A2) at a mass ratio of 2/98 to 40/60.

3. The curable silicone composition according to claim 1, wherein component (B) is an organopolysiloxane having a fluoroalkyl group with 1 to 12 carbon atoms or a fluoro(poly)ether-containing organic group.

4. The curable silicone composition according to claim 1, wherein component (D) is a solvent mixture consisting of one solvent or two or more solvents selected from the group consisting of diethyl ether, dipropyl ether, diisopropyl ether, dibutyl ether, diisobutyl ether, di-sec-butyl ether, di-tert-butyl ether, methyl-tert-butyl ether, ethyl-tert-butyl ether, pentane, m-xylene hexafluoride, methylheptafluoropropyl ether, methylnonafluorobutyl ether, ethylnonafluorobutyl ether, and 3-methoxy-1,1,1,2,2,3,4,4,5,5,6,6,6-tridecafluoro hexane.

5. The curable silicone composition according to claim 1, further comprising (E) a hydrosilylation reaction control agent.

6. A release coating agent comprising the curable silicone composition according to claim 1.

7. A release film comprising:
a film-like substrate; and
a release layer consisting of a cured product obtained by curing the release coating agent according to claim 6.

8. The release film according to claim 7, wherein the film-like substrate is a plastic film.

9. The release film according to claim 7, wherein the film-like substrate is light transmissive.

10. The release film according to claim 7, wherein the release layer has a thickness of 0.5 μm or less.

11. A laminate comprising a structure in which a silicone adhesive layer is disposed so as to face at least one release layer, wherein the release layer is a release layer consisting of a cured product formed by curing the release coating agent according to claim 6.

12. A laminate, comprising:
a first substrate;
a release layer on the first substrate;
a silicone adhesive layer on the release layer; and
a second substrate on the silicone adhesive layer;
wherein the release layer is a release layer consisting of a cured product formed by curing the release coating agent according to claim 6.

13. A laminate, comprising at least one structure obtained by successively laminating two or more structure units comprising:
a substrate;
a release layer on the substrate; and
a silicone adhesive layer on the release layer;
wherein the release layer is a release layer consisting of a cured product formed by curing the release coating agent according to claim 6.

14. A laminate, comprising:
a first substrate;
a first release layer on the first substrate;
a silicone adhesive layer on the first release layer;
a second release layer on the silicone adhesive layer; and
a second substrate on the second release layer;
wherein at least one of the first release layer and the second release layer is a release layer consisting of a cured product formed by curing the release coating agent according to claim 6.

15. A laminate, comprising at least one structure obtained by successively laminating two or more structure units comprising:
a substrate;
a first release layer on the substrate;
a silicone adhesive layer on the first release layer; and
a second release layer on the silicone adhesive layer;
wherein at least one of the first release layer and the second release layer is a release layer consisting of a cured product formed by curing the release coating agent according to claim 6.

16. The laminate according to claim 13, wherein the substrate is a film-like substrate.

17. A laminate comprising a structure in which a first release layer is disposed so as to face one of two surfaces of a silicone adhesive layer, with a second release layer disposed so as to face the other surface, wherein:
- at least one of the first release layer and the second release layer is a release layer consisting of a cured product formed by curing the release coating agent according to claim 6; and
- the release force (F1) upon releasing the silicone adhesive from the first release layer differs from the release force (F2) upon releasing the silicone adhesive from the second release layer.

18. A laminate comprising a structure in which a first release layer is disposed so as to face one of two surfaces of a silicone adhesive layer, with a second release layer disposed so as to face the other surface; wherein:
- at least one of the first release layer and the second release layer is a release layer consisting of a cured product formed by curing the release coating agent according to claim 6; and
- the release coating agent forming the first release layer differs from the release coating agent forming the second release layer.

19. The laminate according to claim 11, wherein the entire laminate is in a roll shape.

* * * * *